Oct. 4, 1960 A. H. FRÖHLICH 2,954,818
METHOD AND APPARATUS FOR MAKING PNEUMATIC TIRES
Filed Oct. 28, 1954 21 Sheets-Sheet 2

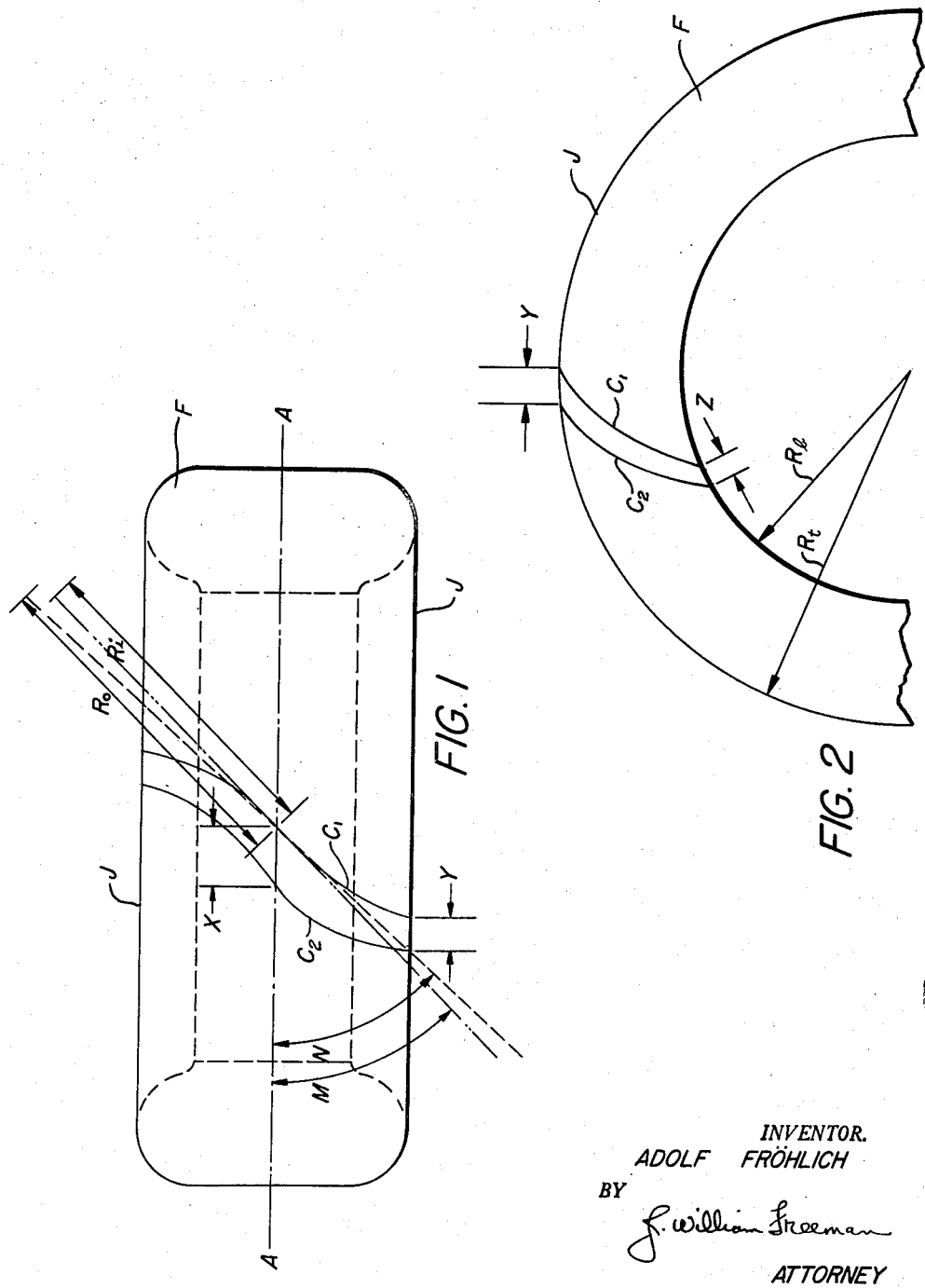

INVENTOR.
ADOLF FRÖHLICH
BY
ATTORNEY

INVENTOR.
ADOLF FRÖHLICH
BY
ATTORNEY

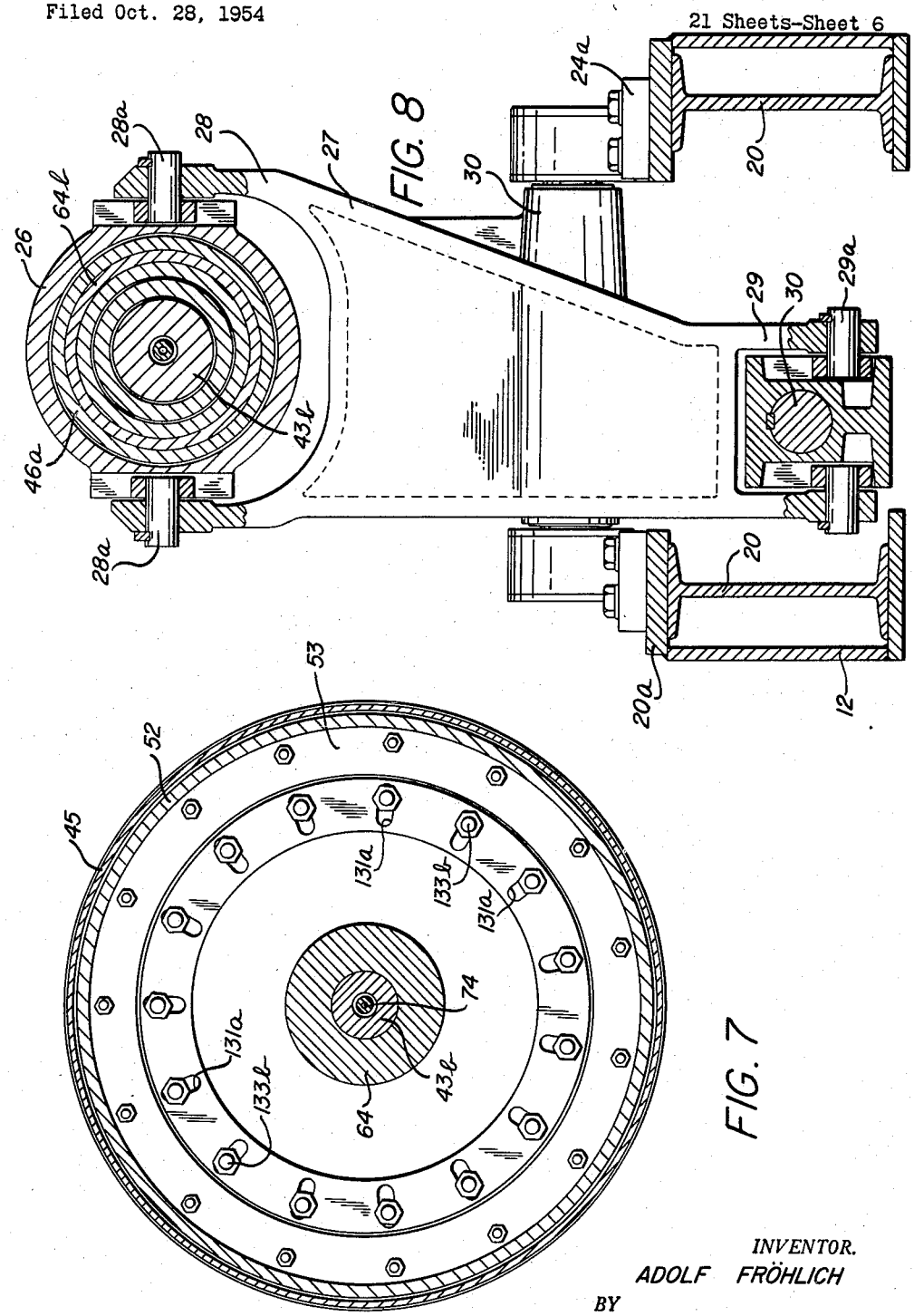

Oct. 4, 1960          A. H. FRÖHLICH          2,954,818
METHOD AND APPARATUS FOR MAKING PNEUMATIC TIRES
Filed Oct. 28, 1954          21 Sheets-Sheet 7
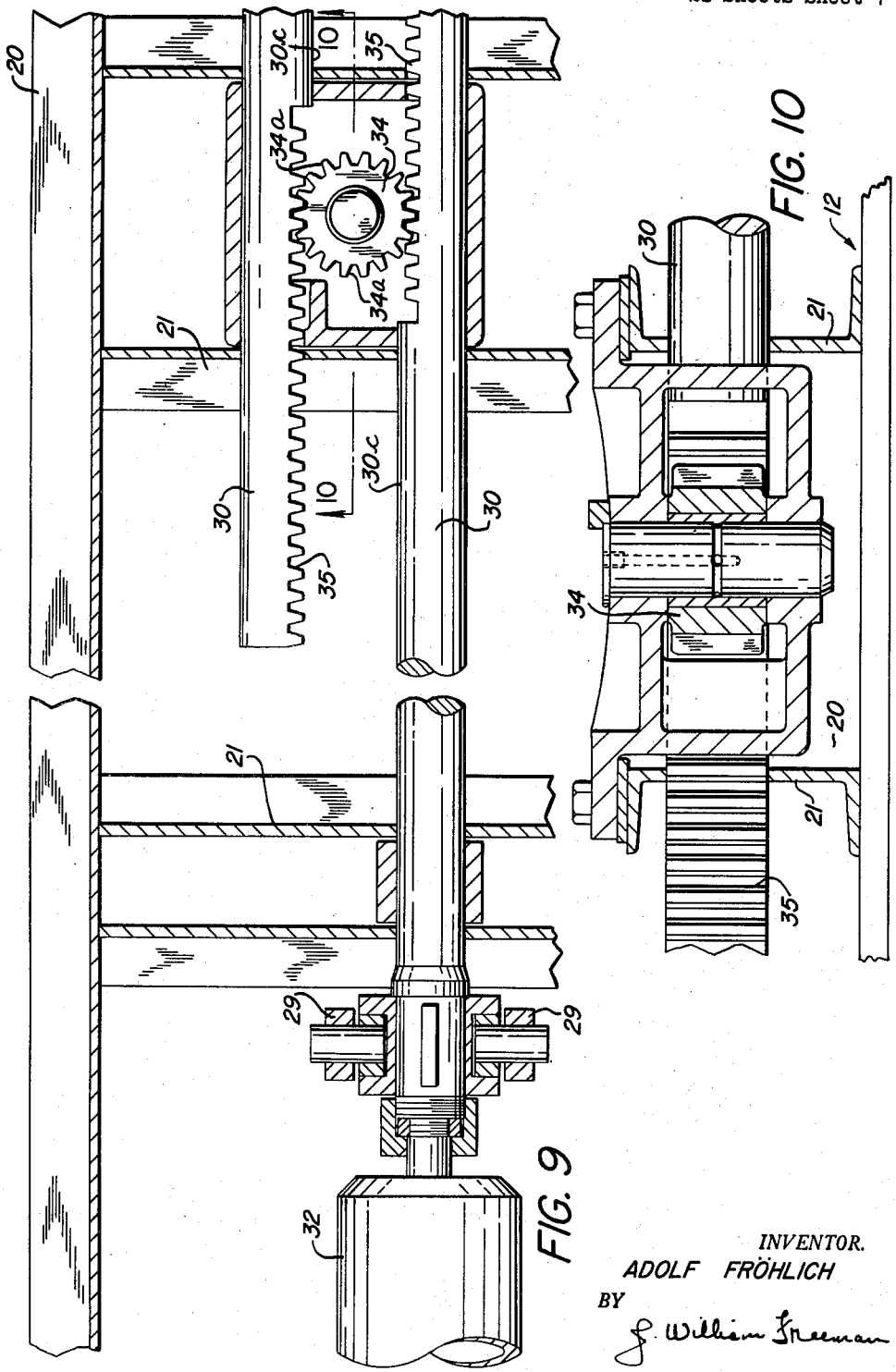
INVENTOR.
ADOLF FRÖHLICH
BY
ATTORNEY

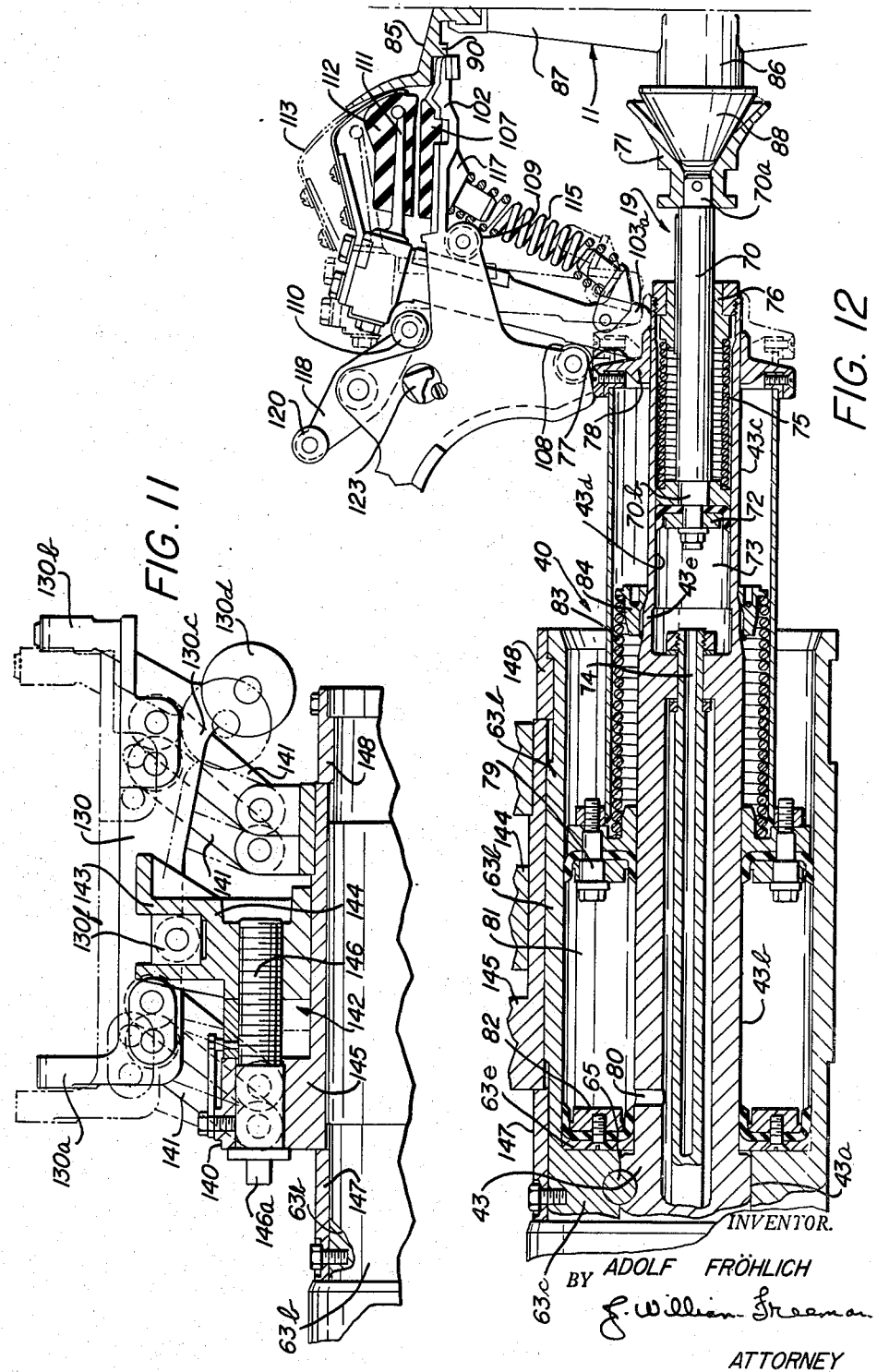

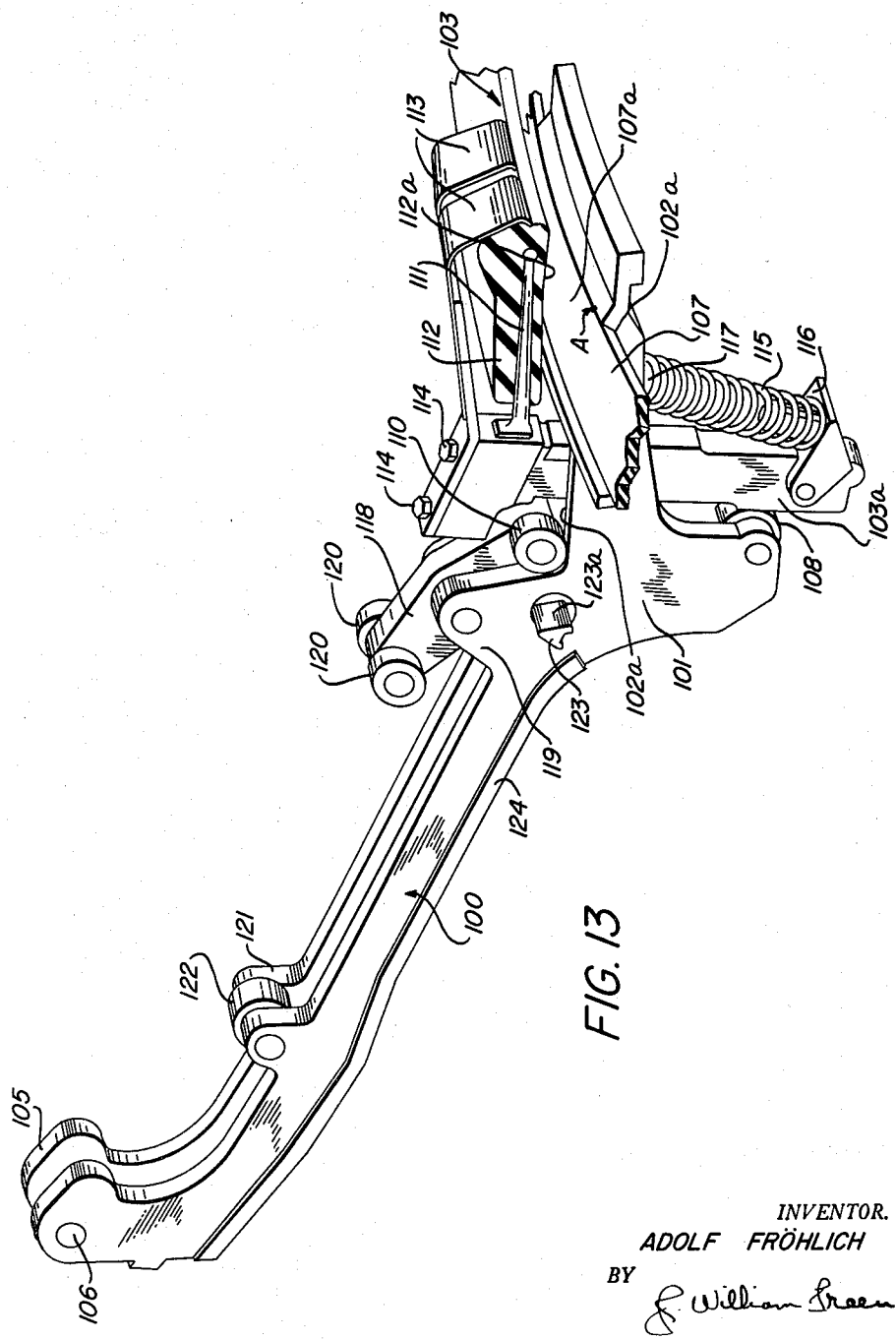

INVENTOR.
ADOLF FRÖHLICH

INVENTOR.
ADOLF FRÖHLICH
BY
J. William Freeman
ATTORNEY

Oct. 4, 1960  A. H. FRÖHLICH  2,954,818
METHOD AND APPARATUS FOR MAKING PNEUMATIC TIRES
Filed Oct. 28, 1954  21 Sheets-Sheet 17

INVENTOR.
ADOLF FRÖHLICH
BY
*R. William Freeman*
ATTORNEY

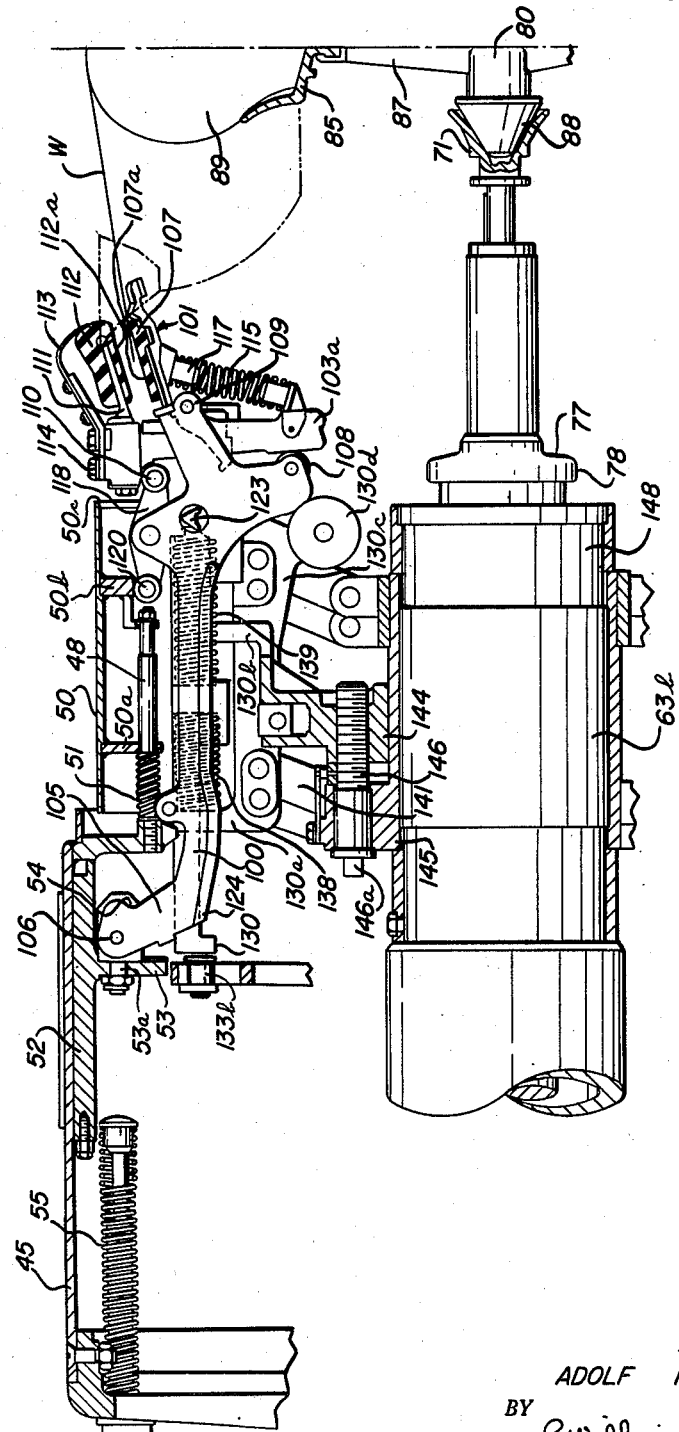

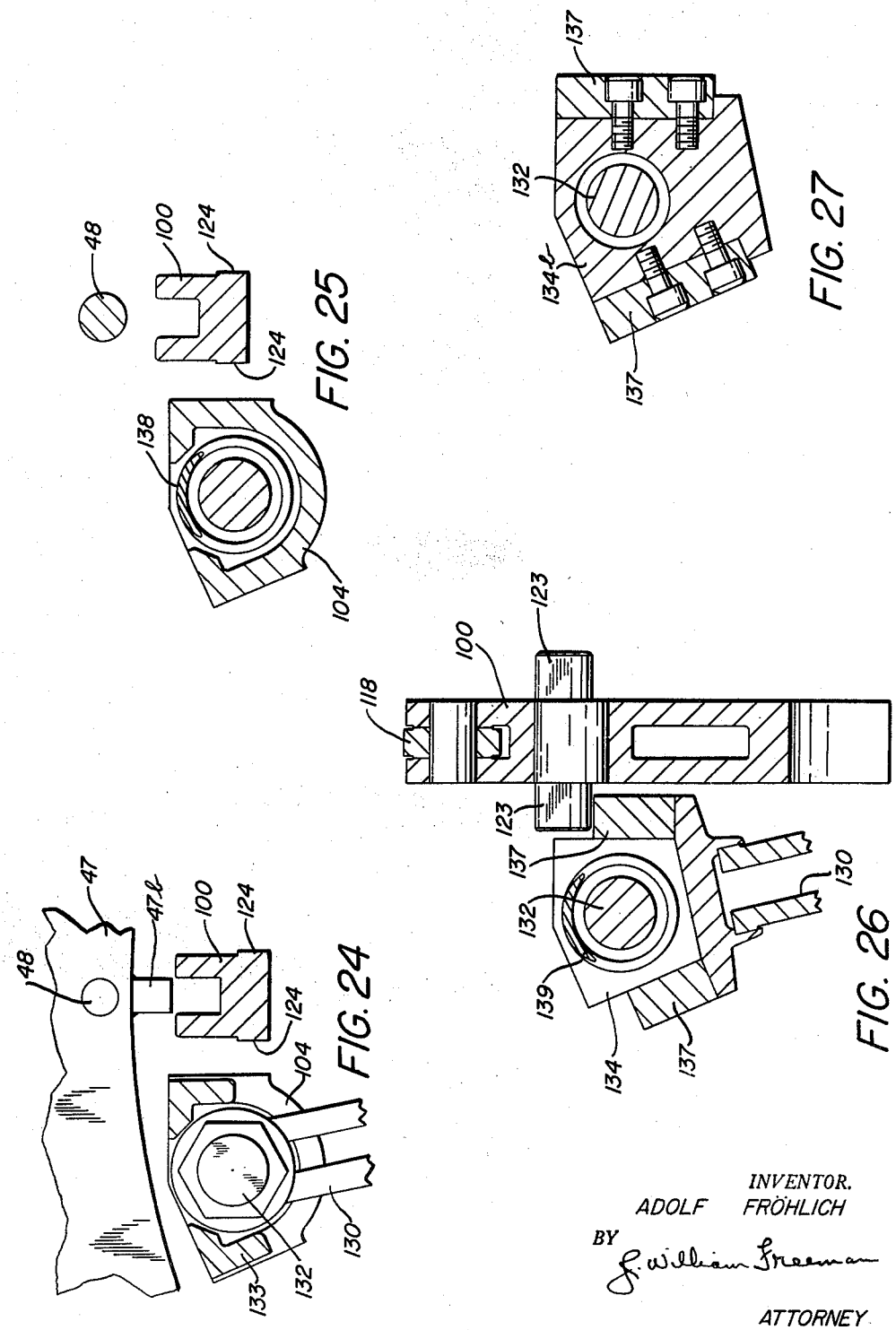

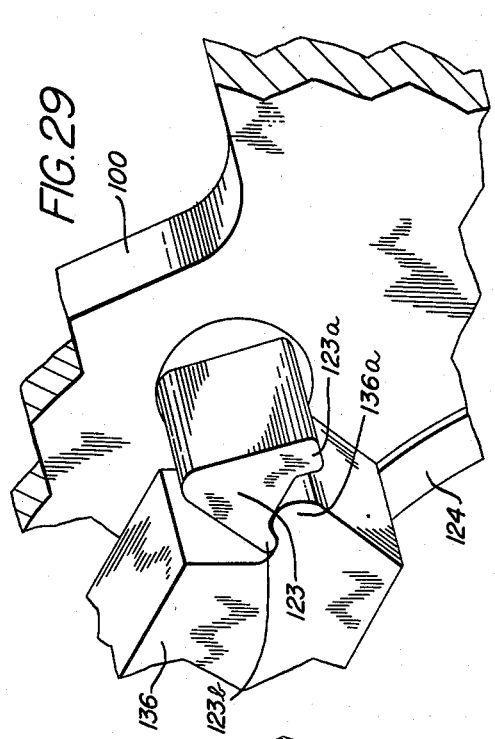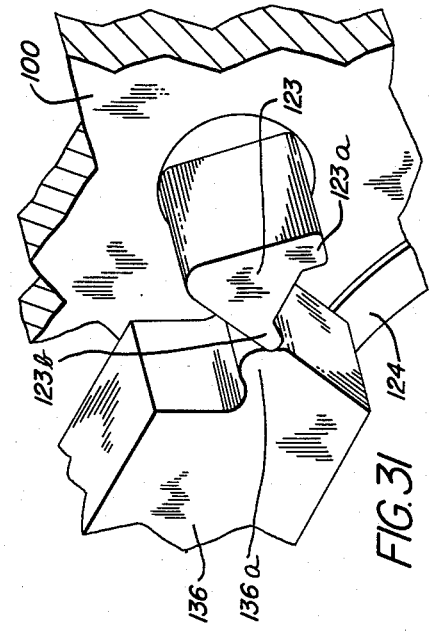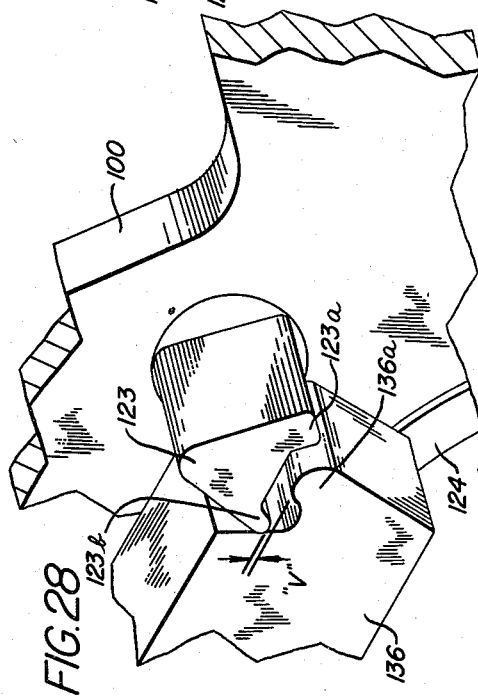
INVENTOR.
ADOLF FRÖHLICH
BY J. William Freeman
ATTORNEY United States Patent Office 2,954,818
Patented Oct. 4, 1960

2,954,818

METHOD AND APPARATUS FOR MAKING PNEUMATIC TIRES

Adolf H. Fröhlich, Hannover, Germany, assignor to The Cleveland Trust Company, Cleveland, Ohio, as trustee Filed Oct. 28, 1954, Ser. No. 465,385

28 Claims. (Cl. 154—10)

This invention relates to pneumatic tires and in particular, relates to improved methods and apparatus for building pneumatic tires.

For several years past, pneumatic tires have been constructed by building up a plurality of fabric plies on a cylindrical building drum to produce, in known manner, what is conventionally referred to as a "flat-built" tire of tubular construction. This uncured "flat-built" green tire was then deformed to the customary toroidal shape by the use of an air bag positioned interiorly thereof, and this uncured toroidal form was then vulcanized to produce the finished tire.

The above known prior art has been found disadvantageous in several respects, the first and foremost of which relates to the abnormal stress placed on the individual cord members of the fabric plies during the period that the "flat-built" green tire is deformed to its toroidal shape. In this regard, it is manifest that the toroidal shaped tire has a greater radial girth than the width of the fabric ply, with the result that the cords are longitudinally extended to compensate for this increased girth. From the foregoing, it is necessary that the cords employed in the fabric plies be of the type that are longitudinally extensible.

This prerequisite has substantially limited the use of certain longitudinally non-extensible cord materials such as nylon and wire, due to the fact that this type of cord, being longitudinally non-extensible, is dislodged from the surrounding green rubber of the fabric ply during the period of deformation by the air bag, with the result that use of such cords is precluded.

A further disadvantage of the known prior art relates to the creation of wrinkles in the sidewall area of the fabric ply during the aforementioned period of deformation. These wrinkles occur adjacent the head area of the tire as a result of the diameter being less at this point than the diameter of the tread area. The obvious effect of such wrinkles from a structural standpoint is that the same cause the individual cords to be loosely folded in this area, with the result that the effectiveness thereof is impaired in this area. Additionally, these wrinkles must be smoothed out for appearance purposes, with a stitching tool, the use of which sometimes results in premature, inadvertent damage to the cord members.

From the foregoing, it appears manifest that the known prior art methods of pneumatic tire construction result in the creation of non-uniform stress in the individual fabric cords of the pneumatic tire. These stresses, in the form of longitudinal tension, are extremely severe in certain areas, while being non-existent in other areas. The overall result of such abnormality is a pneumatic tire having a plurality of cord members incapable of functioning in the most efficient manner.

In U.S. Patent 2,503,815, certain improved tire building apparatus was set forth that was intended to obviate the above difficulties. In essence, this apparatus taught the use of a retracting curvilinear movement to apply fabric plies about a centrally positioned annular building core. The purpose of the retracting curvilinear movement in this apparatus was to create uniform tension in the cord members by making the retracting curve approximate the girth of the core. In this manner, the fabric applied to the core was always under some degree of tension, with the result that tires produced by this apparatus were characterized by the presence of cord members that were under varying degrees of longitudinal tension.

While this apparatus made a marked contribution to the art of pneumatic tire construction, it has been discovered that improved results can be obtained by modifying the retracting curvilinear movement of U.S. Patent 2,503,815, so that the curving path of the gripping elements moves, during part of the period of application, through a path that is axial with respect to the building core. Specifically, it has been discovered that if the combined axial and radial movement of the grippers that define the retracting curvilinear path, is interrupted by a cycle in which the grippers move axially of the building core, that improved results will occur.

In theory it is submitted that this interruption period of straight axial movement of the gripping elements operates to change the bias angle of the cord members of the fabric ply being applied, with the result that the same are shifted from the usual condition of parallelism with each other to a theoretically perfect condition where the spacing therebetween is greatest in the tread area thereof, and gradually diminishes to a closely spaced relationship at the bead diameter. Accordingly, it is submitted that this rearrangement of the cord members, as above indicated, serves to produce, for the first time, a pneumatic tire having cord elements thereof arranged in theoretically perfect relationship with each other wherein the spacing therebetween is uniformly increased from the bead diameter to the axis of symmetry of the tire. Such a tire, because of the relatively close spacing between the cords at the opposed edge portions that define the bead diameter, is free from wrinkles in the area adjacent the bead diameter; and additionally, this varied spacing serves to create uniform tension through the longitudinal extent of the individual cord members.

The apparatus employed in the achievement of this novel theory constitutes an improved form of apparatus from that disclosed in U.S. Patent 2,503,815, and specifically includes improved retractable gripping elements, improved building drums, an improved building core as well as improved means for effectuating more efficient coaction between these improved elements, in a manner that will become more apparent upon a reading of the specification.

Accordingly, it is one object of this invention to provide a new and novel method of constructing pneumatic tires characterized by cord rearrangement in the fabric plies during the building process.

It is a further object of this invention to provide a pneumatic tire having the cord elements thereof arranged in theoretically perfect relationship with each other, wherein the spacing therebetween at the bead diameter is less than the spacing therebetween at the axis of symmetry of the tire.

It is a still further object of this invention to provide a pneumatic tire having the cord elements thereof under substantially uniform longitudinal tension.

It is a still further object of this invention to provide a method of pneumatic tire construction characterized by the fact that substantially longitudinally non-extensible cord elements can be employed therein to produce a preformed pneumatic tire.

It is a still further object of this invention to produce a green tire of toroidal shape that is characterized by the absence of wrinkles in the sidewall area adjacent the bead portions thereof.

It is a still further object of this invention to provide apparatus capable of effectuating the above objects.

These and other objects of the invention will become more apparent upon a reading of the following specification, considered and interpreted in the light of the accompanying drawings.

Of the drawings:

Figure 1 is a schematic top plan view illustrating the spacing between two adjacent cord members.

Figure 2 is a schematic side elevation showing the position of the adjacent cord members of Figure 1.

Figure 5:
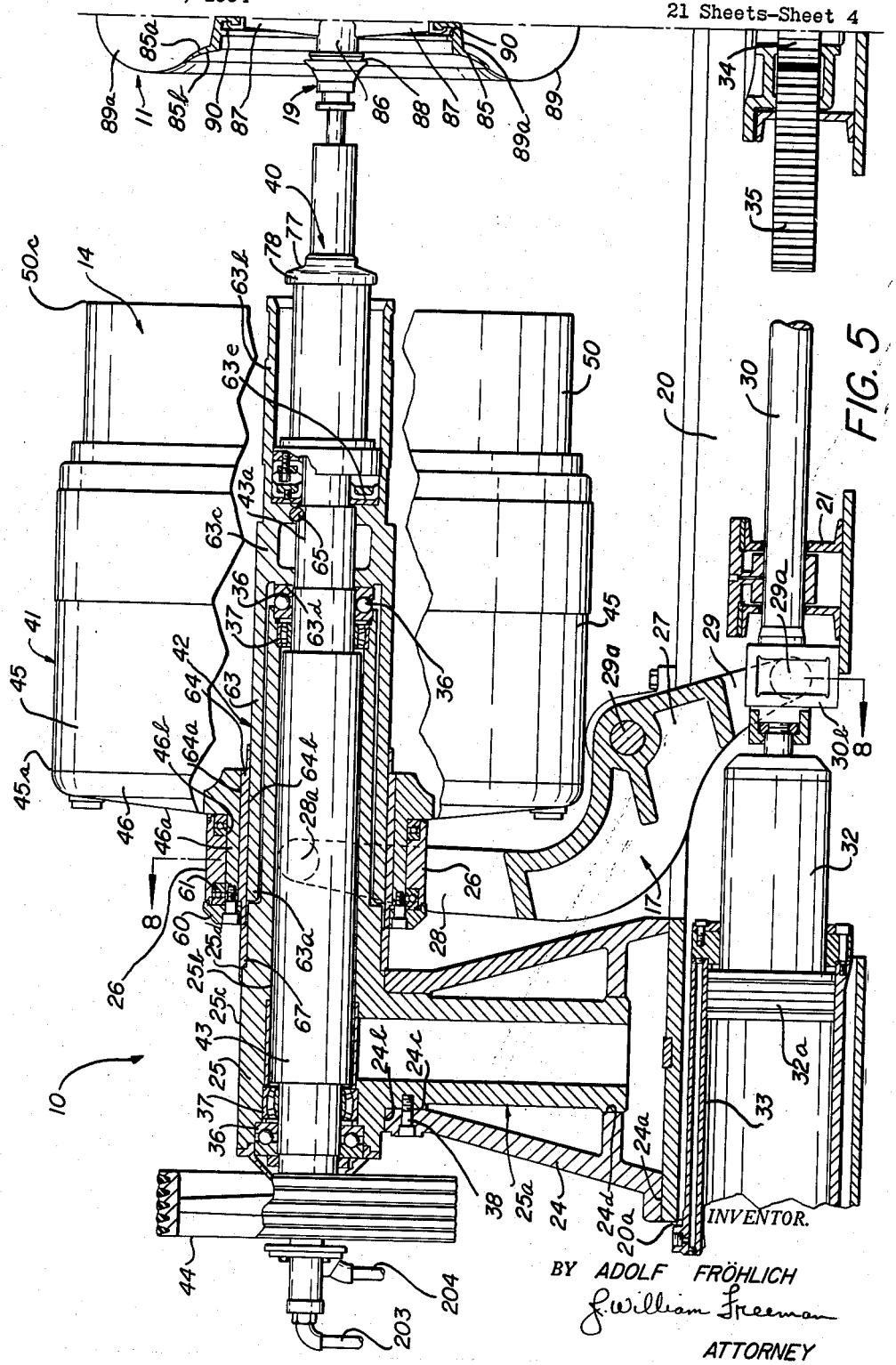
Figure 5 is a vertical elevation partly broken away and in section, and illustrating the construction of the left-hand half of the device of Figure 1.
Figure 16:
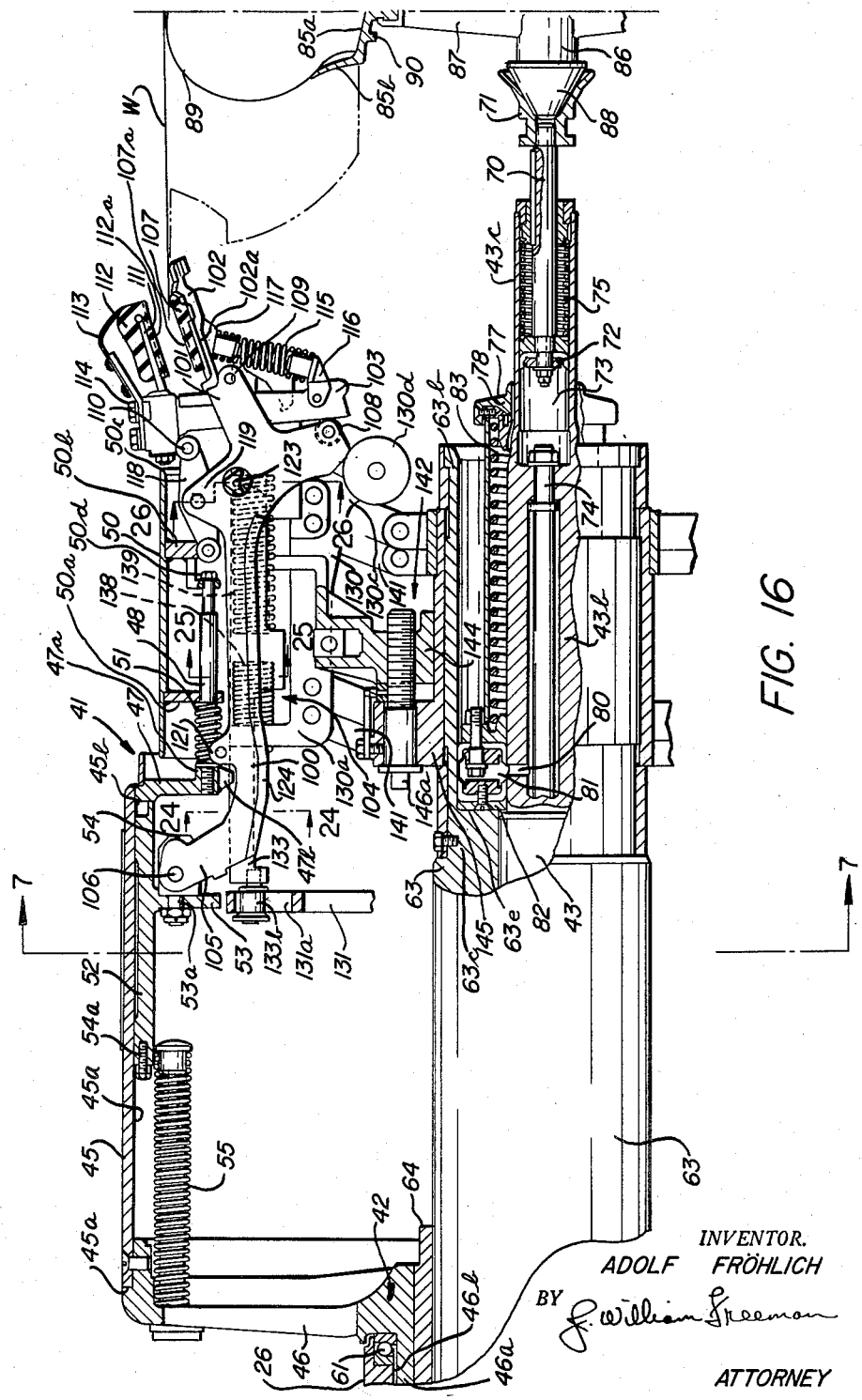

Figures 7 and 8 are sectional views taken on the lines 7—7 and 8—8, respectively, of Figures 16 and 5.

Figure 3:
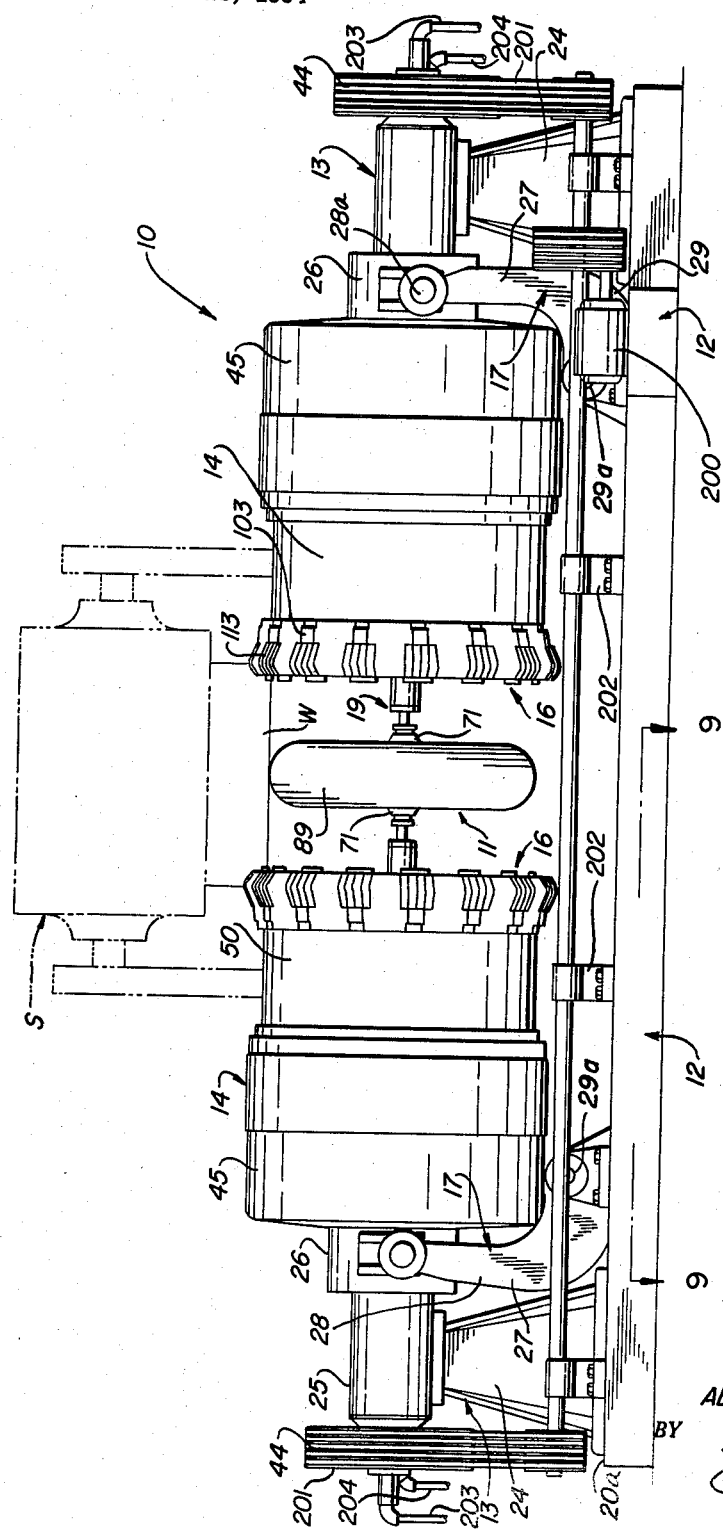
Figure 3 is a side elevation of the overall tire building machine in the open position.

Figure 9 is a plan view taken in section on the lines 9—9 of Figure 3.

Figure 10 is a vertical section taken on the lines 10—10 of Figure 9.

Figure 11 is an enlarged vertical section illustrating the radial adjustment mechanism for the retractable gripping elements.

Figure 12 is an enlarged vertical section illustrating the core supporting mechanism of the improved tire building machine.

Figure 13 is a perspective view illustrating a component part of the retractable gripping mechanism.

Figure 14:
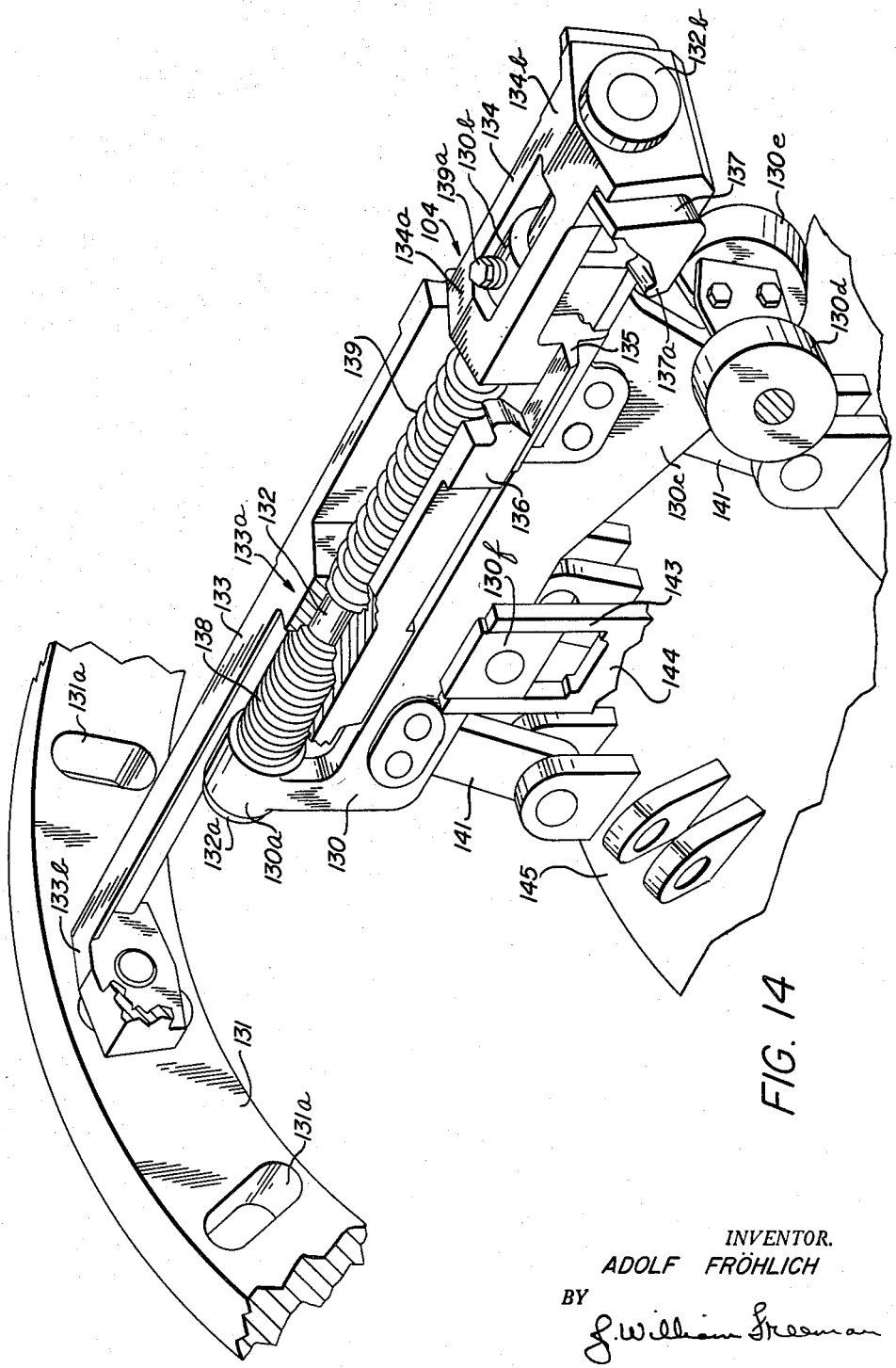

Figure 14 is a perspective elevation, partly broken away and in section, and illustrating the cam mechanism of the retracting grippers.

Figure 15:
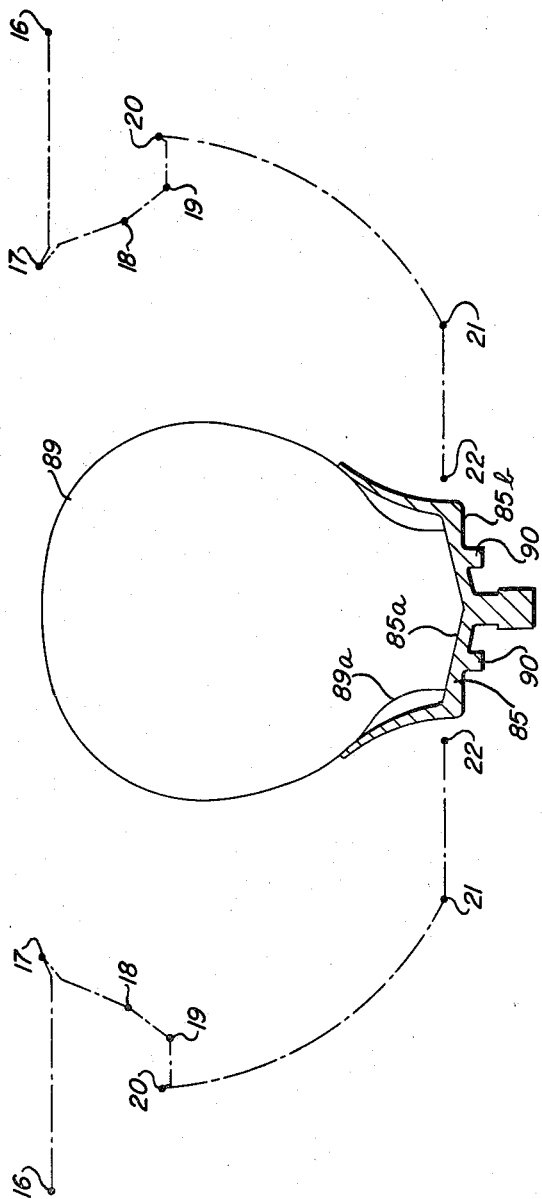

Figure 15 is a schematic illustration of the retracting curvilinear path of movement produced by a point on the opposed gripping mechanisms of the improved tire building machine.

Figures 16 to 23 inclusive, are enlarged partial sections illustrating the position of the component parts of the retractable gripping mechanisms at various points on the retracting curve set forth in Figure 15.

Figures 24, 25 and 26 are vertical sections taken on the lines 24—24, 25—25 and 26—26 of Figure 16.

Figure 22:
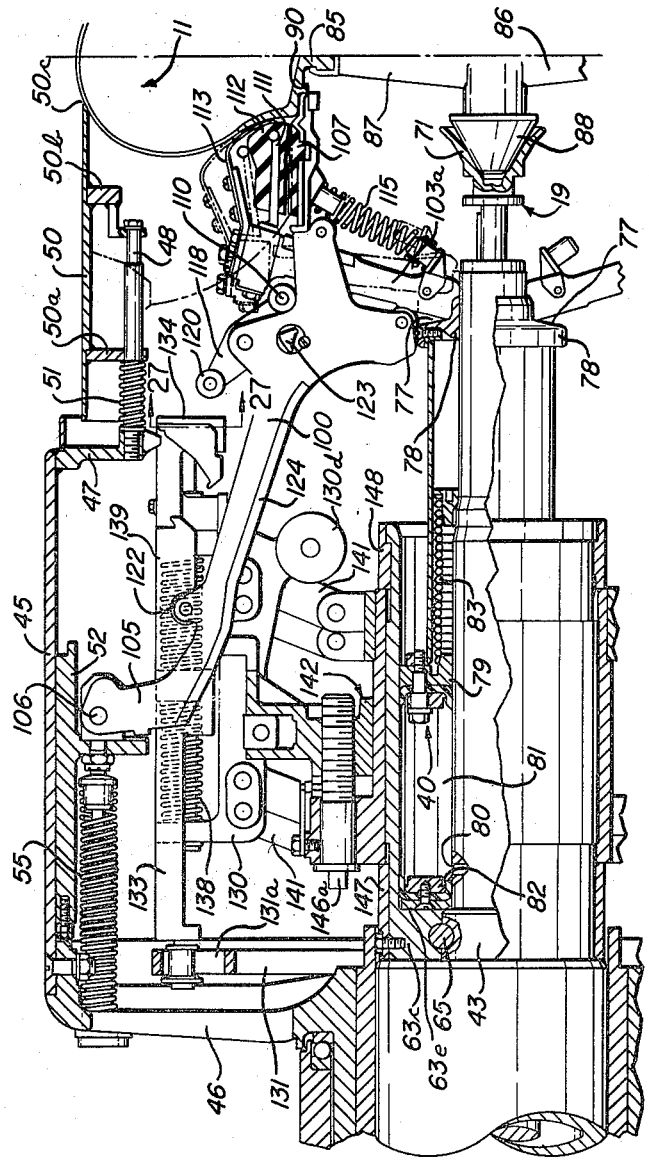

Figure 27 is a section taken on the lines 27—27 of Figure 22.

Figures 28 to 31 inclusive, are enlarged vertical sections illustrating the position of certain coacting parts of the retractable gripping mechanism at various points along the retracting curvilinear path of Figure 15.

The theory of the improved method of pneumatic tire construction can best be understood by reference to Figures 1 and 2 of the drawings, where individual, adjacent cords $C_1$ and $C_2$ are shown positioned about an annular building core F that serves as a building form for a pneumatic tire having an outside tread radius $R_t$, a bead radius $R_b$ and an axis of symmetry A—A. In connection with Figures 1 and 2 it is to be noted that the spacing between the adjacent cords $C_1$ and $C_2$ is exaggerated for the sake of clarity, and it is to be understood that this spacing, in actual practice, will be but a fraction of that shown in Figures 1 and 2.

Accordingly, in Figure 1 the cords $C_1$ and $C_2$ are illustrated as being spaced by distance "X" at the axis of symmetry A—A, while the spacing between the cords $C_1$ and $C_2$ at the opposed juncture lines J, J of the sidewall and tread areas is somewhat less and is shown as defined by dimensions "Y," "Y." Similarly, the opposed end portions of the cords $C_1$ and $C_2$ are shown spaced at the bead radius $R_b$ by distance designated as "Z," "Z," that are less than the previous spacings referred to as "X" and "Y." It is believed apparent from the foregoing that the spacing between the cord members $C_1$ and $C_2$ diminishes on both sides of the axis of symmetry A—A as the opposed bead radii $R_b$, $R_b$ are approached, and further that this narrowing of the spacing is uniformly graduated, with the result that the cord members $C_1$ and $C_2$ are applied about the core T in theoretically perfect aligned relationship.

It is to be further noted, with regard to Figure 1, that the cord $C_1$ is changed with respect to the length and bias angle thereof from the chain-dotted position of Figure 1 to the position indicated by the solid dash lines as a result of the novel retracting curvilinear movement of this invention. Specifically, the length of the cord C increases from $2R_1$ to $2R_o$ and the bias angle increases angularly from M to N.

The above changes are submitted to occur as a direct result of the modified retracting curvilinear path of movement illustrated in Figure 15 of the drawings, and especially as relates to the movement between points 19 and 20 thereof, it being apparent that a more complete understanding will exist upon examination of the novel apparatus utilized to achieve this novel method.

Figure 4:
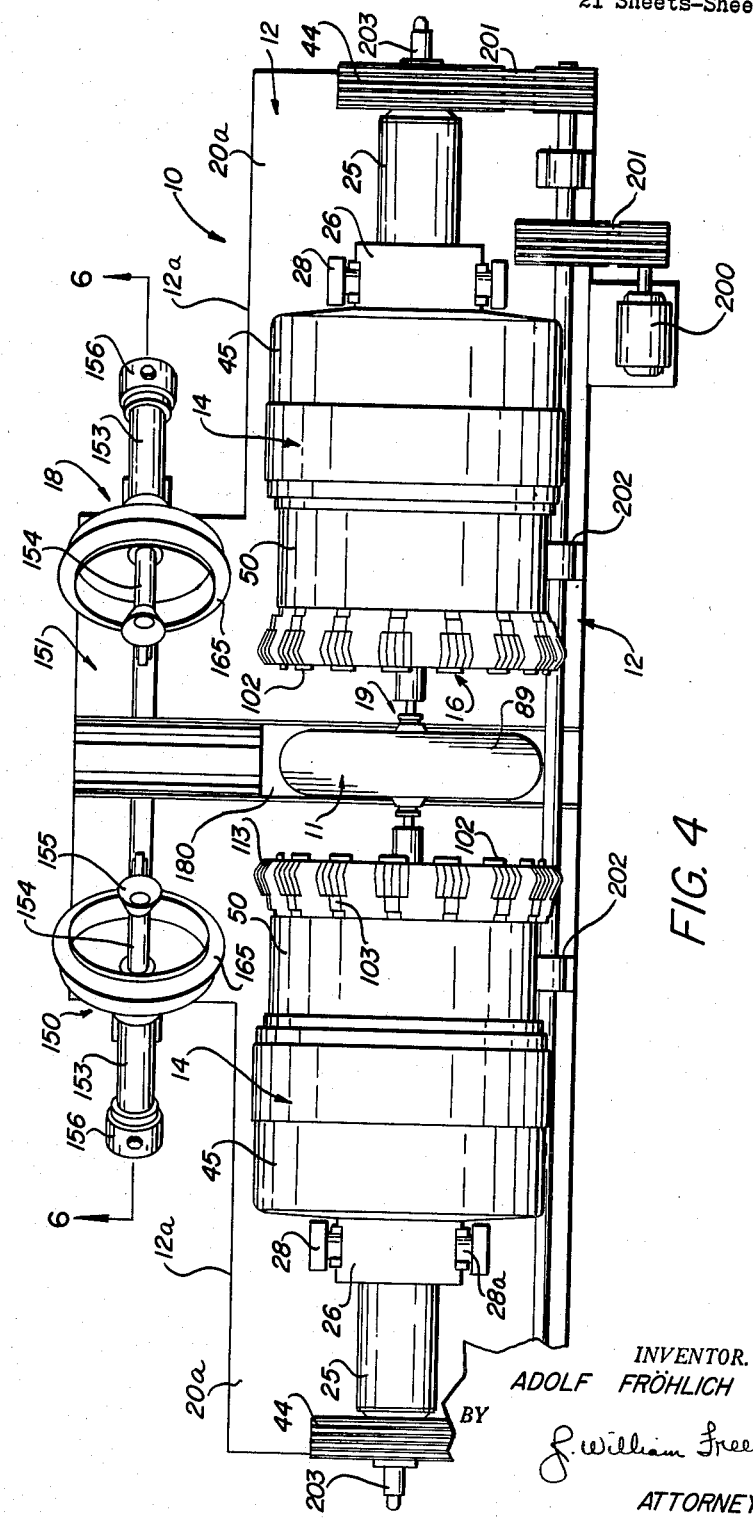
Figure 4 is a top plan view of the overall tire building machine in the open position and including a top plan view of the bead setting mechanism.

Accordingly, referring now to the drawings, and in particular, to Figures 3, 4 and 5 thereof, the improved tire building machine, generally designated as 10, is shown adapted to successively apply the opposed edge portions of a plurality of tire plies, W, W about an annular building core 11, in retracting curvilinear movement, to thus create a preformed pneumatic tire characterized by uniform tension in the cord elements thereof.

The tire building machine 10 that is employed in building such a preformed tire, is illustrated as being broadly defined by a rectangular base 12 that includes opposed drum supporting standards 13, 13 that function to space a pair of relatively rotatable, axially shiftable, tire building drums 14, 14 equidistant about a centrally positioned building core 11. Application of the individual tire plies W, W about the external peripheral surface of the building core 11, is shown effectuated through the medium of a plurality of retractable gripping means 16, 16, each of which is pivotally hinged to the building drums 14, 14 so as to move through a retracting curvilinear path upon axial closing movement of the building drums 14, 14 by an actuating means 17, that is shown as pivotally interconnecting the base 12 and the building drums 14, 14 so as to control relative movement therebetween. A bead setting mechanism, designated as 18 (see Figure 4), is shown positioned centrally of the base 12, adjacent one side edge 12a thereof, for coaction with the tire building machine 10 in a manner to be described.

For the sake of clarity, the various component parts above generally described, will be discussed individually in order that their separate contributions to the overall operation of the tire building machine might be more fully understood. Accordingly, the base 12 and the opposed drum supporting standards 13, 13 secured thereto are described in conjunction with the actuating means 17 that initiates longitudinal movement of the building drums 14, 14 longitudinally of the base 12. By like token, the support means, designated as 19 that are employed to space the opposed building drums 14, 14 equidistant about the building core 11, and the unitary operation of these component parts is individually described. Similarly, the description of the retractable gripping mechanisms 16, 16 and the bead setting mechanism 18 is separately discussed.

In certain of the drawings representative of the retractable gripping mechanisms 16, 16 (see Figures 16–23) for example, only one such mechanism 16 has been illustrated in elevation for the express purpose of clarifying the operation thereof. It is emphasized at this point, however, that a plurality of such retractable gripping means 16, are provided in the tire building machine at arcuately spaced points on the periphery of each building drum 14, and accordingly, these drawings are representative of the operation of all such retractable gripping mechanisms that are positioned elsewhere in the machine. In actual use, for example, fifteen such gripping mechanisms 16, 16 are employed in each building drum 14, making a total of thirty such retractable gripping mechanisms that are used in the tire building machine 10. Similar attention is directed, especially with respect to the retracting gripping mechanism, to the fact that certain component elements thereof are located in arcuately disposed adjacent planes. Certain elevation drawings illustrating the operation of the gripping mechanisms 16, 16, indicate these parts as being in the same general plane of elevation and accordingly, careful reference should be made where indicated, to sectional views illustrating the invention.

By like token, in undertaking the description of this tire building machine, it is important to emphasize that a similar action takes place on each side of the axis of symmetry of the tire being built. Accordingly, in describing certain component parts, reference will be made only to that portion of the machine that appears to one side of the axis of symmetry, it being understood that the machinery positioned on the opposite side of the axis of symmetry would be exactly equivalent in all respects.

*Description of base, drum supporting standards and actuating means therebetween*

As previously indicated, the building drums 14, 14 are longitudinally shiftable with respect to the base 12 by actuating means 17. In this manner, the tire building drums 14, 14 are longitudinally shiftable along the axis of the base 12 and are additionally axially rotatable with respect to both the base 12 and the drum supporting standards 13, 13.

To this end, the base 12 is generally illustrated as being of elongated rectangular configuration, the construction of which is conventional in that the same includes the usual longitudinally extending structural supports 20, 20 as well as cross supporting members 21, 21 that are provided in normal fashion. (See Figure 9.)

The drum supporting standards 13, 13 may be generally designated as being of two-piece construction and accordingly, the same include a pedestal 24 having the base portion 24a thereof secured to the top surface 20a of the base 12 and being additionally illustrated as having the top surface 24b thereof apertured so as to define cylindrical bearing surfaces 24c, 24d, that serve to receive a cylindrical extension 25a of a spindle guide 25. This spindle guide 25 includes an internal surface 25b that is designed to rotatably receive a driving shaft 43 that serves to rotate the tire building drums 14, 14 and additionally, the external surface 25c of the spindle guide 25 acts as a guide surface for a surrounding, axially shiftable, thrust ring 26 that coacts with central structural portions of the tire building drums 14, 14, so as to move the same, as a unit, longitudinally of the base 12 in a manner to be described. (See Figure 5.)

To this end, the actuating mechanism 17 that is operable between the base 12 and the building drums 14, 14 includes a link member 27 having opposed yoke ends 28 and 29 that are pivotably movable about a shaft 29a that is fixed with respect to the base 12. Each link 27 is arranged so that the yoke ends 28 and 29 thereof are pinned as at 28a, 29a, in vertically shiftable relationship with respect to the thrust ring 26 and a longitudinally extending shaft 30, respectively. The shaft 30 extends longitudinally of the base 12, and has one end thereof connected through linkage 30b, to the free end of a piston rod 32; the head 32a of which is reciprocal in a piston cylinder 33, provided in the base 12.

For the purpose of providing uniform axial movement of the opposed shafts 30, 30 about the axis of symmetry of the core 11, the base 12 includes a centrally located compensating gear 34 that has external geared surface 34a thereof engageable with gear racks 35, 35 that are provided on the internally presented surfaces 30c, 30c of the shafts 30, 30. In this manner, axial movement of one piston rod 32 results in rotational movement of the compensating gear 34 through the medium of the gear racks 35, 35. This rotational movement of the compensating gear 34 by one rack 35 will cause an equivalent axial advancement of the remaining rack 35 and accordingly, the axial movement of each piston rod 30 on opposite sides of the axis of symmetry of the tire building machine 10 will be equal. (See Figures 5, 9 and 10.)

Additional features of structure included in the drum supporting standards 13, 13 relate to the provision of the usual ball and tapered roller bearing units 36, 36 and 37, 37 that serve to obviate axial displacement and angular deflection of the rotatable spindle 43 rotatably carried thereby, while rotational movement of spindle guide 25 about the axis of the extension 25a is prevented by use of a set screw 38.

*Description of building drums, building core, and supporting means therebetween*

The actual building of the preformed pneumatic tire is, in practice, effectuated by the tangential application of a plurality of fabric plies over the building core 11 that is supported equidistantly between the opposed, axially shiftable, rotatable building drums 14, 14 by a core supporting mechanism that has been generally designated as 19. (See Figures 5 and 16.)

To the end of constructing the building drums 14, 14 in accordance with the previously described requisites, each building drum 14 is shown as being made up of component elements that generally include a cylinder 41 that is radially spaced about a central hub 42. Rotation of the cylinder 41 and hub 42, relative to standards 13, 13 is facilitated by a pin 65 that interconnects the drum 14, as defined by cylinder 41 and hub member 42 with main spindle shaft 43 that is rotatably received interiorly of the spindle guide 25; the arrangement of the component parts being such that rotation of the shaft 43 by driving means 44 will result in rotation of the drum 14 about its axis of rotation as defined by cylinder 41, hub 42 and shaft 43.

Each cylinder 41 in actuality, is made up of a plurality of component parts, and accordingly, the same includes a main shell 45 that has one end 45a thereof, engaged by a spider-type end wall 46 that spaces the shell 45 radially about the hub 42, while the opposed free end 45b thereof is shown welded to a radially inwardly extending ring 47, the inner radial edge of which is provided with a plurality of apertures 47a, 47a that receive a plurality of axially extending shaft members 48, 48. The ring 47 also includes radially inwardly extending cam surfaces 47b, 47b that operate to coact with certain portions of the retractable gripping means 16, 16 in a manner to be subsequently described. (See Figure 16.)

To the end of supporting the fabric plies W, W, when the drums are in the closed position, the cylinder 41 is additionally shown as including a cylindrical ply-receiving shell 50 that is radially positioned in axially shiftable relationship with respect to the main shell 45 through the medium of radially projecting, axially spaced, ring members 50a and 50b, the radially inward edge portions of which are apertured for axially shiftable reception about the shaft members 48, 48. For reasons to be described, the tapered free end 50c of the cylindrical ply-receiving shell 50 is shown urged axially away from the main shell 45, by the use of coil springs 51, 51 that have their opposed ends received against the ring 47 and the lugs 50a, 50a, respectively, it being understood that the usual end collar 50d is provided on the freely presented end of the shaft 48 for limitation of such axial movement. (See Fig. 20.)

To the end of pivotally supporting the free ends of certain elements of the retractable gripper mechanism 16 in a manner to be described, the internal surface 45a of the main shell 45, is shown engaged by an axially shiftable, inner ring member 52 that further includes a centrally disposed, radially inwardly depending, ring 53 that is provided with a plurality of apertures 53a, 53a for reception of lug supports 54, 54 that attach to certain component elements of the retractable gripping mechanism 16 in a manner to be described. Additionally, adjustment screws 54a, 54a are provided in the ring 52 for control of the axial movement thereof with respect to the shell 45; and by like token, the end wall 46 of the cylinder 41 is illustrated as including a plurality of axially extending bumper mechanisms 55, 55, the free ends of which operate to tensionally engage the ring 53. (See Figure 16.)

Turning now to the construction of the hub member 42, it will be seen that the same is defined by an axial extension 46a of the end wall 46 so as to provide a cylindrical seat 46b for the thrust ring 26, the usual retaining flange 60 being utilized with ball bearing units 61, 61 for this purpose. The end wall 46, together with the cylindrical axial extension 46a thereof, is shown as being rotatably secured to one end 63a of a driving sleeve 63 through a bushing 64 that has keyways 64a, 64b provided on the external and internal surfaces thereof for this purpose. (See Fig. 5.)

The driving sleeve 63 is further illustrated as being of elongated tubular construction, and additionally, includes a central radial support 63c that is keyed to an extension 43a of shaft 43 by pin 65. Additionally, the opposed radial walls 63d, 63e of the support 63c serve respectively, as seats for a roller bearing unit 36 and the core supporting mechanism 19; while axial spacing of the end 63a of the driving sleeve 63, with respect to a shoulder 25d of the spindle guide 25 is provided for by use of a spacer ring 67.

Referring now to Figure 12 for a consideration of the core supporting means 19, it will be seen that the same is defined by shaft 70 that is axially shiftable interiorly of the internal surface 43d provided in an axial extension 43c of the spindle shaft 43. One free end 70a of this shaft 70 is shown secured to a bell-shaped flange 71, while the opposed free end 70b thereof is fixed to a piston head 72 that is operable to define a pressurized chamber 73 interiorly of the cylindrical extension 43d, the arrangement being such that the shaft 70 and the bell-shaped flange 71 are axially shiftable upon the application of pressure interiorly of the chamber 73 so as to urge the bell-shaped flanges 71, 71 towards each other upon the application of such pressure from a supply pipe 74. Return from the expanded position just described is shown facilitated by the use of coil springs 75, 75 that have their opposed free ends secured respectively to the piston head 72 and stop rings 76, 76 that are threaded to the shaft extension 43c.

For the purpose of initiating certain movement of component elements of the gripping mechanism 16 during the period of operation thereof, there is provided an actuating mechanism 40 that is shown positioned in surrounding relationship to the cylindrical extensions 43b and 43c of the shaft 43. The operation of this mechanism is independent of the core supporting mechanism 19 just described, and in essence, is such that a cam surface 77 has ring 78 thereof axially shiftable into engagement with a component element of the gripping mechanism upon axial displacement of a piston head 79, it being understood that the ring 78 slides on the shaft extension 43c during such axial movement.

Actuation of such axial movement is caused by the entrance of pressurized fluid through supply port 80 into a pressurized chamber 81, the annular walls of which are respectively defined by shaft extension 43b, piston 79, sealing disc 82 (on sidewall 63e), and end 63b of driving sleeve 63. (See Figure 12.) By like token, return of piston 79 from the expanded position of Figure 12 is accomplished by use of a spring 83 that seats against piston 79 and a stop ring 84 that is fixed to a shoulder 43e of shaft 43.

The building core 11 that has been described as being positioned equidistant between the building drums 14, 14 by the core supporting mechanism 19, is shown as including an endless annular rim flange 85 that is radially spaced about an axial hub 86 by spokes 87, 87. This hub 86 has the axially opposed ends thereof defined by cone-shaped members 88, 88 that are designed for reception and engagement with the bell-shaped flange members 71, 71. The construction of the building core 11 is further defined by provision of an annular air bag 89 of inflatable material and having the inner radial surface 89a thereof seated on the internal wall 85a of the endless rim flange 85. The external surface 85b of this endless rim flange 85 is also provided with axially spaced radially inwardly extending stop rings 90, 90 that serve to restrict the radial inward movement of the gripping mechanism 16, in a manner to be described. (See Figures 3, 5, 12 and 20.)

For the purpose of permitting the tire to be rotated so as to check the balancing of the same prior to removal from machine 10, the cones 88, 88 are mounted on the opposed ends of the hub 86 through the medium of ball bearing units (not shown).

*Description of retractable gripping mechanism*

The retractable gripping mechanism 16, has been previously indicated as being operable upon axial movement of the opposed tire building drums 14, 14 to tangentially apply one or more fabric plies about the centrally located building core 11. Specifically, this application of fabric plies from a servicer S (see Figure 3), is effectuated as a result of the retracting curvilinear path followed by the inboard, freely presented gripping ends of the gripping mechanism 16. For the purposes of this specification, the description of one individual gripping mechanism 16 will be set forth in detail, it being understood that a plurality of such gripping mechanisms 16, 16 are provided around the circumference of each drum 14, the arrangement being such that arcuately adjacent gripping mechanisms 16, 16 will engage successively adjacent edge portions of the fabric ply at a plurality of points on the circumference thereof.

Accordingly, the retractable gripping mechanism 16, best illustrated in Figures 16 to 23 of the drawings, is illustrated as including a curving arm 100 that has one free end 101 thereof, supporting inner and outer cooperating gripping elements 102 and 103, respectively; the path of which is controlled and determined by a cam guide mechanism 104 that is carried by the driving sleeve 63 of the drum 14.

The curving arm 100, the contoured outline of which is best illustrated in Figure 13 of the drawings, serves as an interconnecting link between the edge portion of the fabric ply W that is placed about the central core 11, and the axially shiftable, rotatable drum 14, and accordingly, the end 105 of the curving arm 100 is pivotally secured as at 106 to the previously described lug extension 54 of the ring 53. (See Figure 16.)

The opposed free end 101 of the curving arm 100, that has been designated as the inboard end, is defined by the inner gripping element 102 that acts as a support for the fabric ply W during the period that the drum 14 is retracted from the central core 11 in a manner to be described.

In Figure 13 of the drawings, the reference numeral "A" has been applied to the gripping element 102, and the various locations of the point "A" in Figures 16–23 inclusive, are numerically indicated by corresponding numerals in Figure 15.

This gripping element 102 is shown offset as at 102a, to provide a seat for an endless rubber band 107 that has the gripping surface 107a thereof engageable with the fabric ply. For the purpose of supporting the outer gripping element 103 in cooperating relationship with the element 102, the same (outer gripping element 103) is shown having a handle extension 103a that is received through an appropriate aperture 102b in the curving arm 100 so as to be supported in aligned, vertically shiftable, relationship to the curving arm 100, through idler rollers 108, 109 and 110 that are carried by the curving arm 100. The outer gripping element 103 is shown provided with a plurality of axially ending fingers 111, 111 that receive an endless rubber band 112 that has a gripping surface 112a thereof, designed for engagement with the fabric ply W during its period of application about core 11. In addition, the outer gripping element 103 includes a plurality of contoured wipers 113, 113 that are secured to the outer gripping element 103 by bolts 114, 114 so as to effectuate a wiping action against the ply that has been applied about the building core 11. (See Figure 22.)

In the open position of Figure 16, the gripping surfaces 107a and 112a are shown urged out of engagement with each other by a coil spring 115 that is seated against appropriate abutments 116, 117 provided on the handle extension 103a and the gripping element 102a, respectively. A positive lock in this regard is provided for by the roller 110, which is located on one free end of link member 118 that is pivoted around a boss 119 of the curving arm 100 and has the opposed free end provided with an equivalent roller 120 that engages the radial ring 50b of the ply receiving drum 50.

By like token, axial movement of the gripping mechanism 16 with respect to the rotatable drum 14 during certain portions of the axial movement thereof, is shown facilitated by the provision of a lug extension 121 that carries an idler roller 122 that is engaged in abutting relationship against the complemental lug 47b provided on the depending radial ring 47.

During the period of retracting curvilinear movement to be described, the curving arm 100 is initially maintained in the position of Figure 16 by the provision of a triangular-shaped cam plug 123 that extends outwardly from the opposed sidewalls 110a, 110b of the curving arm 100, so as to engage the cam guide mechanism 104 in a manner to be described. By like token, the curving arm 100 includes a contoured follower surface 124 that engages certain cam rollers of the guide mechanism 104 as will be described. (See Figs. 13 and 16.)

Accordingly, the guide mechanism 104 that determines and controls the retracting curvilinear path of movement of the gripping elements 102 and 103, is defined by the component parts effectuating relative movement between a spindle yoke 130 and a relatively movable support ring 131. To this end, the spindle yoke 130 that is carried by the driving sleeve 63 in a manner to be described, includes axially aligned trunnion members 130a and 130b for receiving a spindle 132 that is axially shiftable with respect to the spindle yoke 130, is shown controlled by the relative movement between a spindle guide 133 that is secured to the support ring 131 and a second spindle guide 134 that is received in axially shiftable relationship about the spindle 132. (See Figure 14.)

While axial alignment of the spindle guides 133 and 134 with respect to each other is provided for by virtue of the spindle 132 being received through the axially aligned spindle support trunnions 134a, 134b and 133a thereof, the spindle guide 134 further includes opposed arcuately projecting ledge slides 135, 135 that receive the underside of a cam 136 provided on the spindle guide 133. (See Figure 14.) An additional cam 137 is similarly provided adjacent one free end of the spindle guide 134, the arrangement being such that these cam members 136, 137 individually coact with the triangular cam plug 122 of the curving arm 100 during various phases of the retracting curvilinear movement of the gripping mechanism 16. (See Figures 28–31.)

Figure 20:
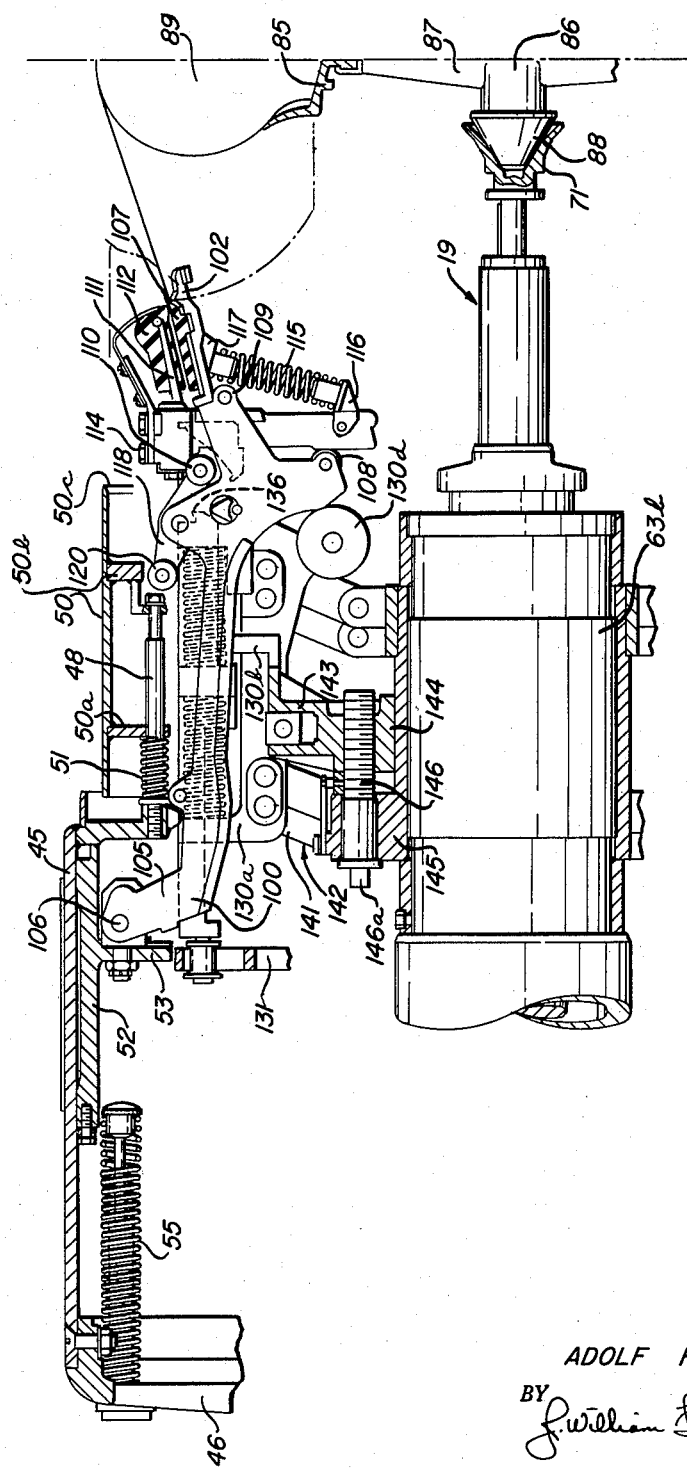

This just described coaction of the cam surfaces 136 and 137 with the cam plug 122, is to some extent, controlled by coil springs 138 and 139 that surround the spindle 132 and have their opposed ends seated as shown, against the spindle yoke 130 and the two spindle guides 133 and 134, the arrangement being such that relative movement of these spindle guides 133, 134 results in the creation of a tensional force that operates to return the spindle 132 as well as springs 138, 139 to the balanced position of Figure 20.

While this just described relative movement between the spindle yoke 130 and the spindle guides 133 and 134 respectively, is controlled by the springs 138 and 139 as indicated, the spindle shaft 132 includes opposed collars 132a and 132b that define positive stops for the spindle yoke 130 and the spindle guide 134. Additional adjustment in this regard may be provided by provision of a set screw 139a provided in the trunnion 130b for obviating relative movement of the spindle yoke 130 with respect to the spindle 132, when desired.

By like token, the spindle yoke 130 is shown contoured at the lower right-hand extremity thereof (see Figure 14), to define a support 130c that rotatably carries idler rolls 130d and 130e which contact the contoured follower surface 124 of the curving arm 100 to provide a cam support therefor during a portion of the retracting curvilinear movement.

For the purpose of radially adjusting the cam mechanism 104 with respect to the axii of the drums 14, 14, the spindle yoke 130 is shown as being supported about the driving sleeve 63 by a radial adjustment mechanism, generally designated as 140. This radial adjustment mechanism 140 is defined by a parallelogram linkage that includes a plurality of link members 141, 141 that interconnect the spindle yoke 130 with a guide supporting mechanism 142 which surrounds the end 63b of driving sleeve 63. (See Figures 11 and 12.)

The component elements of the guide supporting mechanism 142 are arranged in such a manner that the opposed, arcuately extending lugs 130f, 130f of the spindle yoke 130 are received in vertically shiftable relationship within the appropriate yoke ends 143, 143 of a radially extending standard 144 that is axially shiftable with respect to a support ring 145 through the rotation of a threaded shaft 146. In this manner rotation of the turning head 146a of shaft 146 will move the standard 144 axially of the support ring 145, with the result that the link arms 141, 141 will be angularly moved about their pivot points on support ring 145 to thus effectuate radial displacement of the cam guide mechanism 104, it being understood that support ring 131 is modified by the inclusion of radial slots 131a, 131a that receive the ends 133b of spindle guide 133 in radially shiftable relationship.

While radial adjustment of the gripping mechanism 16 about the axii of the drums 14, 14 may be effectuated as just described, provision is also made in the improved tire building machine 10 for axial adjustment of the gripping mechanism 16. To this end, the support ring 145 of the guide supporting mechanism 142 is shown positioned on the cylindrical extension 63b of the driving sleeve 63 by virtue of the abutting relation of the opposed axial ends thereof with a pair of spacer rings 147 and 148 that are secured to extension 63b in known manner; it being understood that these spacer rings 147 and 148 could be provided in different widths to permit axial shifting of the support ring 145 as desired. (See Figure 11.)

Description of the bead setting mechanism

Figure 6:
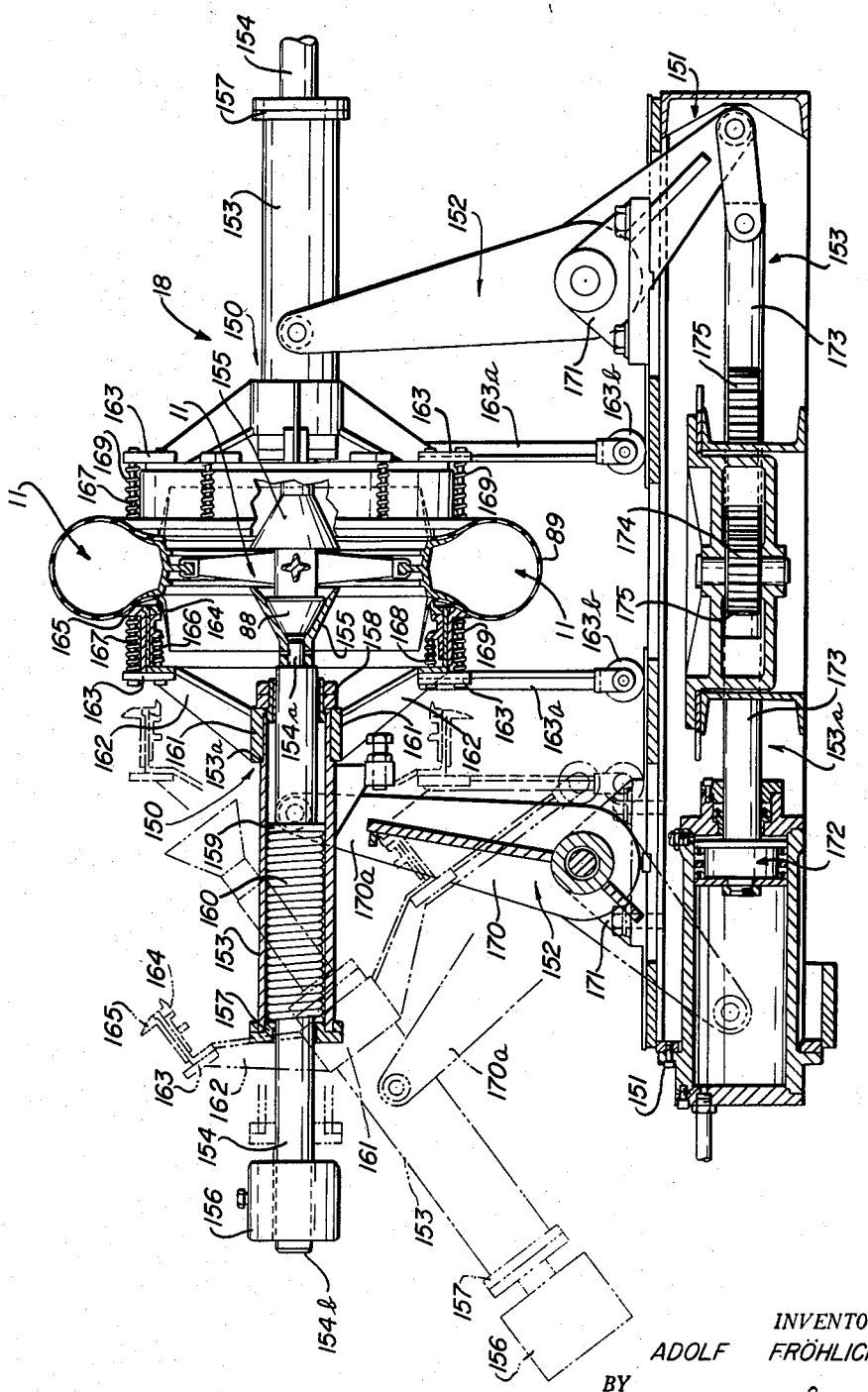
Figure 6 is a vertical section taken on the lines 6—6 of Figure 4, and illustrating the bead setting mechanism in detail.

The bead setting mechanism 19, best illustrated in Figures 4 and 6 of the drawings, is operated independently of the tire building machine 10, for the purpose of providing the usual bead rings in the pneumatic tire; and to this end, the mechanism 19 includes, in essence, a pair of spring-loaded bead applying, rings 150, 150, that are pivotally disposed about a common frame member 151, so as to be capable of being moved from the chain-dotted position of Figure 6 to the full line position thereof, through the action of pivotal links 152, 152, the movement of which is initiated by an actuating mechanism 153.

Each spring-loaded, bead applying ring 150 is shown as including a tubular housing 153 that has a shaft 154 axially shiftable therein, the arrangement being such that one end 154a of this shaft 154 includes a bell-shaped flange 155 that engages the cone 88 of core 11, while the other end 154b thereof, receives an axially adjustable counterweight 156. Axial movement of the shaft 154, with respect to housing 153 is controlled through end walls 157, 158, and in addition, the shaft 154 is provided with a centrally located shoulder 159 that servse as a seat for one end of a spring 160, the opposite end of which engages the end wall 157. The external surface of each housing 153, is shown offset, as at 153b, to define a seat for a hub 161 that includes a plurality of radial spokes 162, 162 that have the free radial ends thereof interconnecting a ring 163. A flanged bead ring 164, as well as a stitching ring 165 are illustrated as being carried in axially shiftable relationship with the ring 163, through the usual pins 166, 166 and 167, 167, respectively, it being manifest that each ring 164 and 165 is spring-loaded with respect to the ring 163 by springs 168, 168 and 169, 169, respectively. (See Figure 6.) By like token, the ring 163 is shown supported during the periods of axial movement thereof by depending frame members 163a, 163a that have the lower extremity thereof provided with the usual wheels 163b, 163b for reception on the top surface 151a of the frame 151.

To the end of providing this just described axial movement to the housing 153, the same (housing 153) is shown pinned to one end 170a of a link member 170, that is in turn pivoted about a fixed trunnion 171 secured to the frame 151. The opposed free end 170b of the link 170 is similarly pinned in known manner to a reciprocal piston mechanism 172, that is arranged to move the link member 170 about the trunnion 171 upon axial movement of piston rods 173, 173, it being understood that equal axial movement of the piston rods 173, 173 will be facilitated by the use of a compensator gear 174 that engages gear racks 175, 175 on the piston rods 173, 173, in known manner.

Operation of the tire building machine

In use or operation of the improved tire building machine 10, for building a preformed pneumatic tire of the character described, it may first be assumed that the machine is in the open position of Figure 3, wherein the opposed building drums 14, 14 are spaced equidistantly about the axis of symmetry of the machine 10. It may further be assumed in this regard that the building core 11 has been centered on this axis of symmetry by use of the core supporting means 19, wherein the bell-shaped flanges 71, 71 have been urged into supporting contact with the cone-shaped hubs 88, 88 of the core 11, this movement taking place upon introduction of pressurized fluid interiorly of the chambers 73, 73. (See Figure 12.)

In this position the drums 14, 14 may be moved in an approaching relationship with each other as a result of actuation of the piston heads 33, 33 as described; it being understood that movement of the piston rod 32 to the left of Figure 5 will cause the link arm 27 to pivot about the pivot point 30 so that the pinned yoke end 28a thereof will axially urge the thrust ring 26 to the right of Figure 5, to thus result in closing movement of the drums 14, 14. During this just described period of movement it is manifest that the drums will approach each other at the same axial rate of advance, in view of the fact that the compensator gear 34 engages the opposed racks 35, 35 of the respective shafts 30, 30.

When the drums have been moved to the closed position as above indicated, it is apparent that a fabric ply may be positioned about the external periphery of the ply-supporting drum 50, by initiating rotation of the building drums 14, 14, through the driving mechanism 44, it being understood that such rotational movement of the shaft 43 is transmitted to the drum 14 through connections 64 and 65, that respectively interconnect the driving sleeve 63 with the hub member 42 and shaft 43. After the fabric ply has been positioned about the external surface of the ply-supporting drum 50 as just described, the drums 14, 14 may be moved apart by reversing the pivotal movement of the link 27, so that the piston rod 32 moves to the right of Figure 5. Such reversal of the direction of movement of the link 27 will cause the building drum 14, together with the ply-supporting drum 50 thereof, to move to the left of Figure 5.

As the building drums 14, 14 move further and further apart it is apparent that correspondingly less and less amounts of fabric ply will be engaged by the ply-supporting drum 50, and continuation of this movement will result in the same (ply-supporting drum 50) becoming entirely disengaged from the fabric ply W. Just prior to this just described disengagement between the ply-supporting drum 50 and the fabric ply W that has been applied thereto, the gripping mechanism 102 will be moving radially upwardly so as to engage the underside of the fabric ply W at the time that the same becomes disengaged from the ply-supporting drum 50. At such time, the underside of the fabric ply will be engaged by the gripping surface 107a of the endless resilient band 107, and accordingly, will be supported thereon. When this contact between the underside of the fabric ply W and the gripping surface 107 occurs, the component parts of the retractable gripping mechanism 16 are substantially in the position of Figure 23. At this point, the gripping surface 112a of the endless resilient band 112, is maintained out of contact with the gripping surface 107a of the endless band 107 by the roller 110 of the link arm 118, the arrangement being such that the abutment 50b prevents pivotal movement of the roller 110 about the pivot point of the link arm 118.

Figure 17:
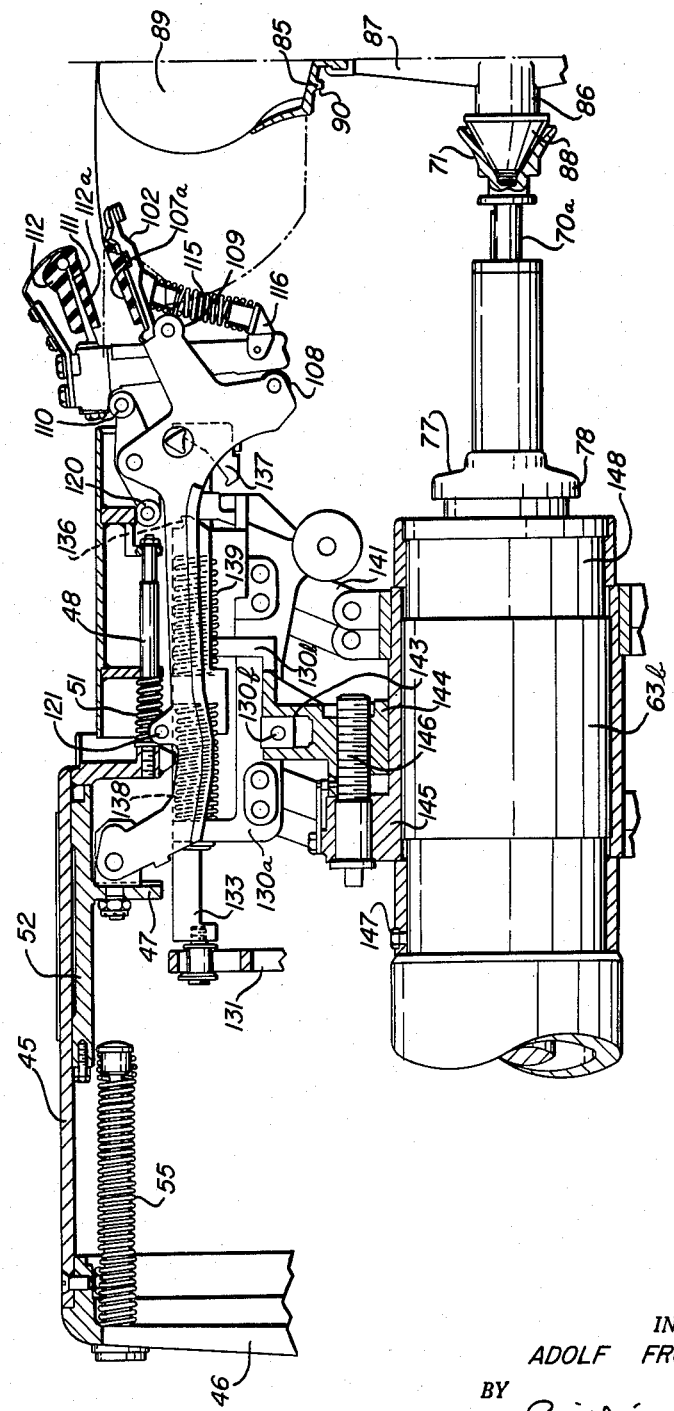

In this condition, the drums are again moved towards each other, and during this period of movement, the curving arm 100 is maintained in the position of Figures 16 and 17 as a result of the contact between the cam plug 123 and the cam surface 136 that is provided on one end of the spindle guide 133. Initially, this cammed interconnection is somewhat spaced vertically as is indicated by the "V" in Figure 28, it being apparent that this vertical spacing between respective cam members 123 and 136 is facilitated by the initial contact between the contoured edge 124 of the curving arm 100 and the idler wheel 130d of the spindle yoke 130. As the relative movement of the curving arm 100 to the right of Figure 16 continues however, the same will be dropped about its pivot point, with the result that the cam surfaces 123 and 136 will drop into the full contact position shown in Figure 29 of the drawings. As further movement of the curving arm 100 to the right of Figure 17 continues, it is apparent that the spring 139 will be compressed by virtue of the fact that the bearing support 133a is moving relatively of the spindle 132 so as to decrease the distance between the bearing supports 133a and 134a to thus compress the spring 139. As further movement to the right of the curving arm 100 continues, as a result of the positive connection between cammed surfaces 123b and 136a (see Figure 29), it is apparent that the opposed cammed edge 123a of the cam plug 123 will strike the incline surface 137a defined by the cam member 137, and accordingly, continued movement to the right of the curving arm 100 will result in the same being pivoted upwardly (see Figure 17) about its pivot point, to thus result in release of contact between the cam members 123 and 136. At the time of this release the spindle guide 133 will be rapidly urged to the left by virtue of the action of the compressed spring 139 and will return substantially to the uncompressed position of Figure 17. At this time the curving arm 100 will be supported about its pivot point against the force of gravity by virtue of the endless rubber band 107, which causes continuation of the contact between the cam plug 123 and the cam surface 137. At this point, the drums 14, 14 will be slightly retracted so that the cam plug 123 will follow the contour of the cam surface 137a, it being apparent that movement of the curving arm 100 along the path of cam 137 will be caused by the contracting forces exerted by the rubber bands 107, 112. At such time, however, as the cam surface 123a becomes connected with the projecting cam surface 137b of the cam surface 137 (see Figure 30), further separating movement of the drums 14, 14 will result in the spring 138 being compressed. However, at such time as the contoured following surface 124 of the curving arm 100 strikes the idler wheel 130d of the spindle yoke 130, a slight lifting of the curving arm 100 will occur about the pivot point 106 thereof, to disengage cam 137 from cam 123. The spindle guide 134 will then move rapidly back to the right against the force created by the compressed spring 138. The beginning of such a lifting action of the cam plug 123 of the curving arm 100 is shown in Figure 30, and reference is directed to this perspective view. At the time disengagement between the cam plug 136 and the cam surface 137 occurs as just described, the curving arm 100 will be supported by the contact between the contoured surface 124 and the idler roll 130d, it being understood that the contracting force offered by the endless resilient bands 107, 112 maintains this contact against the force of gravity. At this time, movement of the drums 14, 14 towards each other will result in the curving arm 100, as well as the gripping elements 102 and 103 thereof following substantially the cam path created by the contoured edge 124 of the curving arm 100.

Figure 21:
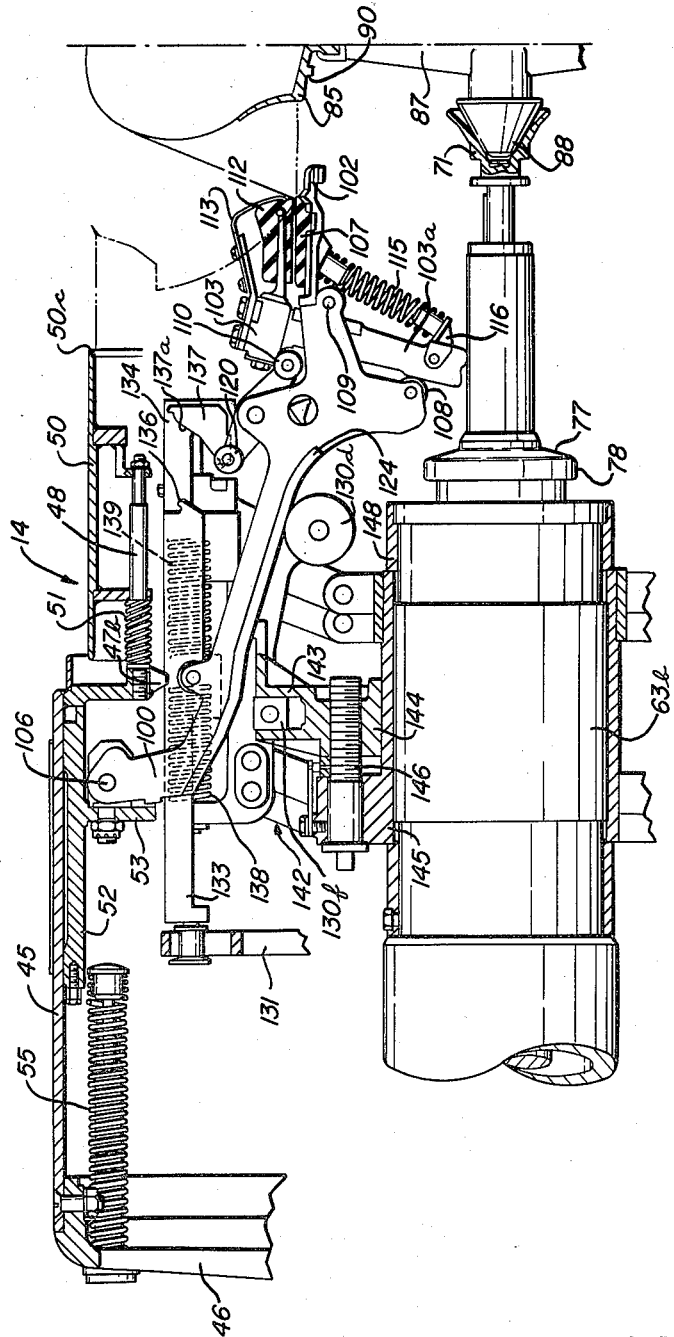

When such further closing movement of the respective building drums 14, 14 operates to position the curving arm 100 in approximately the position of Figure 21 of the drawings, it is manifest that further axial closing movement of the building drums 14, 14 will result in the gripping elements 102, 103 moving axially from the position of Figure 21 to the position of Figure 22. At this time, further inward axial movement of the grippers 102 and 103 is stopped by virtue of the contact between the ring 90, and the free inboard edge of the gripping element 102. At this time, the gripping elements 102 and 103 may be urged apart by axial movement of the cam ring 78 that operates to strike the handle 103a so as to move the same from the full line positions of Figure 22 to the chain-dotted position thereof. During this just described period of pivotal movement, the hammer handle 103a is pivoted about the roller 109, and it is further manifest in this regard, that this pivotal action will cause the wiper elements 113, 113 to strike the radial sidewall surface of the applied fabric to smooth the same down with respect to the rim flange 85. When this wiping action has been completed, the cam ring 77 may be withdrawn simultaneously with the retraction of the building drums 14, 14. During this retracting period, it is manifest that the contoured surface 124 of the curving arm 100 will engage the idler roller 130d and cause the same to move upwardly and to the left of Figure 23. As this movement continues, the cam plug 123 will be urged past the projecting edge of the cam 136, with the result that the spindle guide 133 will be axially shifted to permit the cam 123 and cam 136 to assume the position of Figure 31.

It is believed manifest that, in the position of Figure 22, the drums 14, 14 are in the closed position with the tapered edges 50c, 50c of the ply-receiving drums 50, 50 being tensionally urged against the applied cords on the air bag 89 as a result of the compression of the springs 51, 51. Accordingly, while the gripping mechanism 16 is in the position of Figure 22 of the drawings, it is manifest that a second ply W may be positioned about the external surface of the split ply-receiving drums 50, 50, and accordingly, the occurrence of retracting movement as has just been described, to return the gripping mechanisms 16, 16 will also result in the gripping means 102 being subsequently engaged with the underside of a second fabric ply W for repetition of the just described operation.

Figure 18:
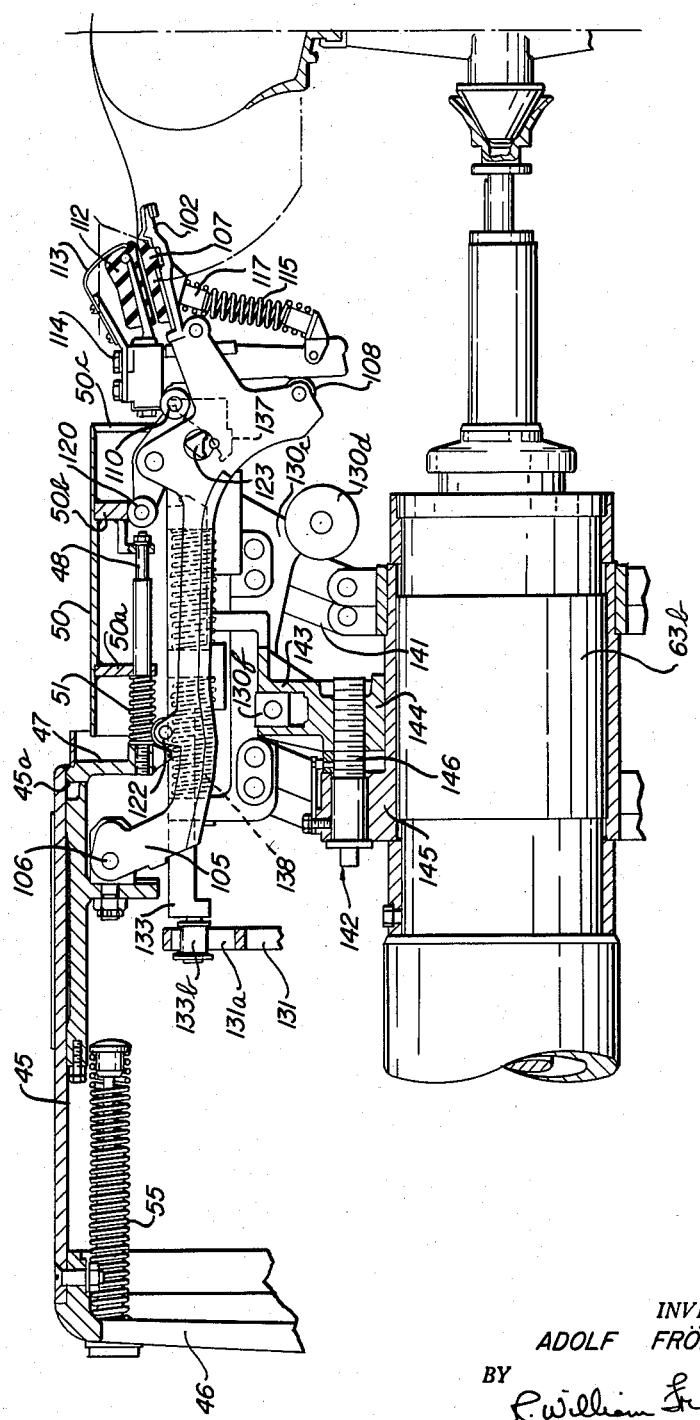
Figure 19:
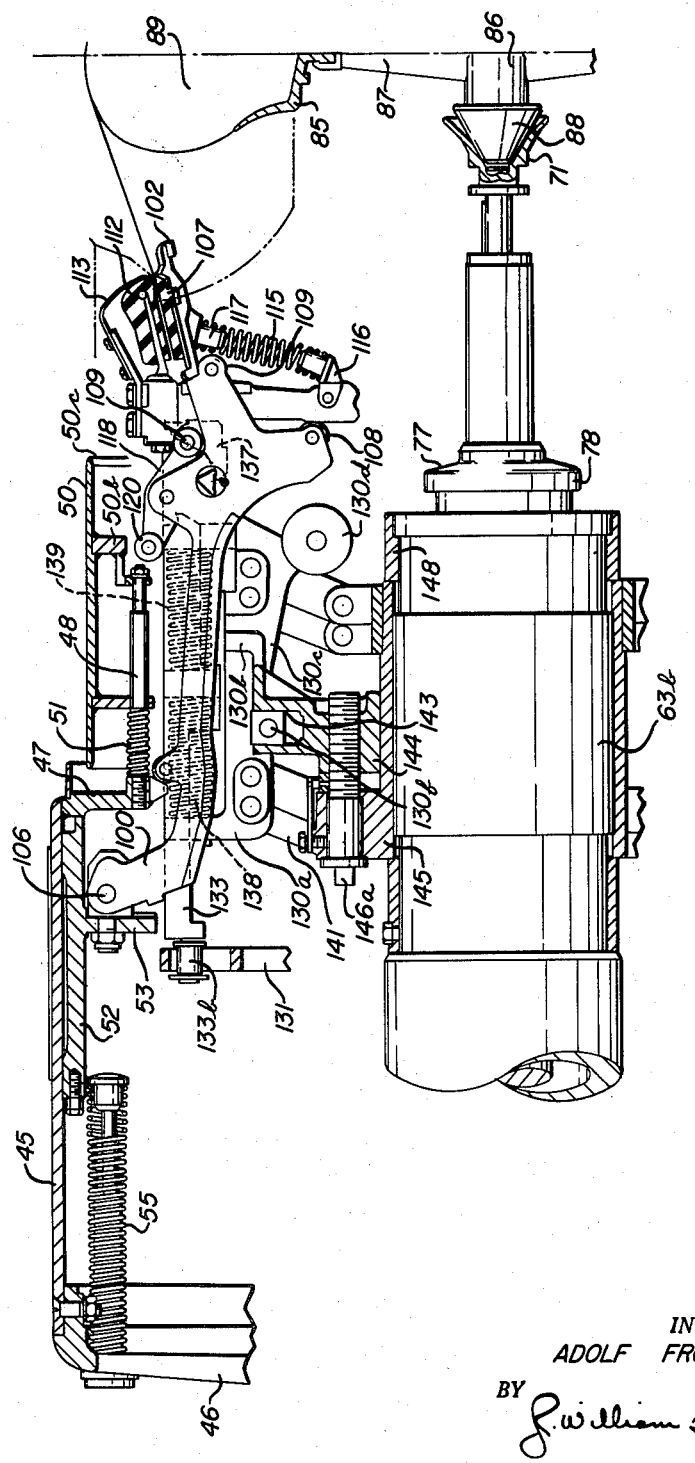

With regard to the movement of the gripping elements 16 during the just described movement from Figure 16 to Figure 23, inclusive, it is believed apparent that in Figure 16 the bands 107 and 112 will be separated by virtue of the fact that flange 50b positions member 118 around its pivot point so that portion 110 thereof underlies the head of the gripping jaw 103, as clearly shown in Figure 16. This condition of separation is continued, as shown in Figure 17, but as the individual arms 100 pivot around pivot point 106, as shown in Figure 18, there will also occur a pivoting of member 118 around its pivot point due to the fact that the contracting force of the band 112 will cause the head of member 103 to move the roller 110 downwardly to the position shown in Figure 18. This condition continues through Figures 19, 20, 21 and 22 and will further continue during the movement of the gripping arms from the position of Figure 22 towards the position of Figure 23.

However, when the position of Figure 23 is approached, the roller 120 will again strike the member 50b to cause pivoting of the member 118, which accordingly forces the member 103 relatively of the socket for the same in the curving arm, with the result that the bands 112 and 107 will be separated as is clearly shown in Figure 23 of the drawings.

After sufficient plies W have been applied around the building core 11 to provide a pre-formed pneumatic tire of desired construction, it is manifest that the bell-shaped flanges 71, 71 may be retracted from their position of support with the cone-shaped hubs 88, 88 of the building core 11, at which time the same, together with the built-up tire fabric thereon, will drop onto the dolly 180 which rides on guide tracks to permit the assembled tire to be moved to the bead setting apparatus 18, where the bead of the tire may be set, it being understood that the bead setting apparatus is in the open position of Figures 4 and 6 at this time.

Accordingly, movement of the pre-formed tire on the dolly 180 on the guide tracks, operates to position the pre-formed tire on the axis of symmetry of the bead setting mechanism 18. In this position, the opposed flanges 155, 155 of the bead applying rings 150, 150 are moved into supporting contact with the cones 88, 88 of the core 11, as a result of the actuating mechanism 153a moving the links 152, 152 from the chain-dotted position of Figure 6 to the full line position thereof. In this full line position, the flanges 155, 155 are in tensional contact with the cones 88, 88 as a result of the force created by the compressed springs 160, 160 and accordingly, the core 11 is centered between these opposed balancing forces that are rendered equal by the action of compensator gear 174 on gear racks 175, 175.

At this time, the bead wires, which are carried by the flanged bead rings 164, 164 are urged against the external surface of the fabric plies that have been positioned on air bag 89, as previously described. This movement results from axial shifting of the housings 153, 153, by the links 152, 152, and during the period of axial shifting it is manifest that the flanges 155, 155 will be held in contact with the cones 88, 88 by springs 160, 160 that are arranged to permit this relative movement of housings 153, 153 with respect to flanges 155, 155. In essence, this axial movement extends between the dotted line and full line positions of Figure 6 and is somewhat arcuate at the ends, the usual provisions being made for vertical shifting in this regard. By like token, this spring-loaded relative movement permits the bead flanges to be withdrawn from the ply surfaces after the bead ring has been set thereon, to thus permit manual turning off of the free ends of the plies over the beads. When this manual operation has been completed, the housings 153, 153 may be once again axially moved towards each other to cause the stitching rings 165, 165 to engage these turned edges of the fabric plies and secure the same to the fabric plies in enveloping relationship to the bead wires.

At this time, the bead setting operation is completed and accordingly, the mechanism 18 may be returned to the open position of Figure 6 by reversing the direction of movement of the actuating mechanism 153a, so that the same is operable to move the housings 153, 153 apart. During this movement the flanges 155, 155, will remain in contact with the cones 88, 88 for a considerable length of time, due to the action of the springs 160, 160, and accordingly, disengagement will occur only after some axial movement of the housings 153, 153.

When this disengagement occurs the pre-formed tire having the bead ring applied thereto, will drop onto dolly 180, at which time the same may be moved to another station for completion of the remaining operations incident to pneumatic tire construction. At this time, the bead flanges 164, 164 may be provided with new bead wires for subsequent repetition of the above operation, and similarly, upon completion of the curing operation, the air bag 89 may be collapsed and removed from the cured tire.

In the preceding specification, a detailed description of certain conventional apparatus has been omitted for the sake of clarity of presentation. It is to be specifically understood, however, that the use of such apparatus falls within the scope and disclosure of this invention. Accordingly, the use of a conventional motor 200, together with pulley drives 201 and shaft supports 202 to create rotation of the spindle 43 in contemplated and similarly, pressure is supplied interiorly of the chambers 73 and 81, by supply pipes 203, 204, that interconnect a pressure source with pipe 74 and opening 80, respectively. Similar use of other conventional apparatus is to be accordingly understood and included in the teachings of the invention.

It will be seen from the preceding paragraphs that there has been provided certain new and novel methods and apparatus for building a pre-formed pneumatic tire, that is characterized by the presence of cord members that are aligned about the tire in theoretically perfect relationship. This novel result was described as being accomplished by the use of a split building drum, the component halves of which were axially shiftable to produce coaction with an improved type of retractable gripping mechanism that was secured to the opposed edge portions of a fabric ply so as to move the same in an interrupted retracting curvilinear path that resulted in the creation of a preformed pneumatic tire.

It is believed manifest that the disclosed mechanism utilized to achieve the above novel results could be modified in several ways within the scope of this invention. For example, the yoke arms 27, 27 could be disposed at an angle of 45° to reduce the overall height of the machine 10, and similarly, power actuated pistons could be employed to control the movement between the inner and outer gripping elements 102, 102 and 103, 103, respectively, and thus increase the gripping action therebetween while simultaneously reducing the effect of gravity on the movement between these gripping elements. Additionally, the various closing and opening of the drums 14, 14 could be timed and initiated by the use of various electronic devices employed conventionally in this regard. By like token, a machine could be designed for vertical movement of one drum only by use of the teachings of this invention.

Additionally, throughout this specification, certain general terminology has been employed for the sake of clarity. For example, where the word "core" has been employed, it is to be specifically understood that any type of building form, including "high" or "low" shoulder drums and collapsible core members, could be employed with equivalent success. Similarly, fabric applied about the ply-receiving drum 50 could be "smoothed" out by use of a smoother arm of the type illustrated in U.S. Patent 2,503,815.

Accordingly, modifications of the invention may be resorted to without departing from the spirit of this invention or the scope of the appended claims.

What is claimed is:

1. A machine for building the fabric structure of a pneumatic tire, comprising; an annular building form having an axis of rotation and receiving a building ply on the peripheral surface thereof; a circular member concentrically disposed around the axis of said spindle; a plurality of elongate arms arranged in a circular course around said axis of rotation with one end of each said arm being pivotally secured to said ring; a plurality of gripping elements, carried by the opposed end of each said arm and being circularly disposed in radially shiftable condition about the axis of said form at an axial distance therefrom with said gripping elements engaging one edge of a ply received on said form; guide means for moving said gripping elements radially inward through an axially and radially shiftable curvilinear path corresponding substantially to the cross-sectional configuration of said form whereby said ply may be applied over said core upon said movement of said gripping elements; and means for radially adjusting the point at which said gripping elements initially grasp a fabric ply received on said form said gripping elements moving axially away from said form in substantial parallelism with said axis of rotation during an increment of movement through said curvilinear path.

2. A machine for building the fabric structure of a pneumatic tire, comprising; an annular building form having an axis of rotation and receiving a building ply on the peripheral surface thereof; a circular member concentrically disposed around the axis of said spindle; a plurality of elongate arms arranged in a circular course around said axis of rotation with one end of each said arm being pivotally secured to said ring; a plurality of gripping elements, carried by the opposed end of each said arm and being circularly disposed in radially shiftable condition about the axis of said form at an axial distance therefrom with said gripping elements engaging one edge of a ply received on said form; guide means for moving said gripping elements radially inward through an axially and radially shiftable curvilinear path corresponding substantially to the cross-sectional configuration of said form whereby said ply may be applied over said core upon said movement of said gripping elements; and means for axially adjusting the point at which said gripping elements initially grasp a fabric ply received on said form said gripping elements moving axially away from said form in substantial parallelism with said axis of rotation during an increment of movement through said curvilinear path.

3. A machine for building the fabric structure of a pneumatic tire, comprising; an annular building form having an axis of rotation and receiving a building ply on the peripheral surface thereof; a circular member concentrically disposed around the axis of said spindle; a plurality of elongate arms arranged in a circular course around said axis of rotation with one end of each said arm being pivotally secured to said ring; a plurality of gripping elements, carried by the opposed end of each said arm and being circularly disposed in radially shiftable condition about the axis of said form at an axial distance therefrom with said gripping elements engaging one edge of a ply received on said form; and guide means for moving said gripping elements radially inward through an axially and radially shiftable curvilinear path corresponding substantially to the cross-sectional configuration of said form whereby said ply may be applied over said core upon said movement of said gripping elements; said gripping elements moving axially away from said form in substantial parallelism with said axis of rotation during an increment of movement through said curvilinear path; said gripping means including a pivoted link arm having one free end thereof defining a gripping element; a second gripping element carried by said link arm and being shiftable into and out of gripping engagement with said first mentioned gripping element.

4. A machine for building the fabric structure of a pneumatic tire, comprising; an annular building form having an axis of rotation and receiving a building ply on the peripheral surface thereof; a circular member concentrically disposed around the axis of said spindle; a plurality of elongate arms arranged in a circular course around said axis of rotation with one end of each said arm being pivotally secured to said ring; a plurality of gripping elements, carried by the opposed end of each said arm and being circularly disposed in radially shiftable condition about the axis of said form at an axial distance therefrom with said gripping elements engaging one edge of a ply received on said form; and guide means for moving said gripping elements radially inward through an axially and radially shiftable curvilinear path corresponding substantially to the cross-sectional configuration of said form whereby said ply may be applied over said core upon said movement of said gripping elements; said guide means including at least one cam surface supported in axially shiftable relationship with respect to said form a complemental cam surface provided on said gripping element and being releasably engaged by said first cam upon movement of said guide means whereby said cam surfaces are moved together axially during one increment of movement of said gripping elements along said curvilinear path; and an idler roll, supported about the axis of said form and adapted to guide said gripping element after disengagement of said cam surfaces said gripping elements moving axially away from said form in substantial parallelism with said axis of rotation during an increment of movement through said curvilinear path.

5. A machine for building the fabric structure of a pneumatic tire, comprising; an annular building form having an axis of rotation and receiving a building ply on the peripheral surface thereof; a circular member concentrically disposed around the axis of said spindle; a plurality of elongate arms arranged in a circular course around said axis of rotation with one end of each said arm being pivotally secured to said ring; a plurality of gripping elements, carried by the opposed end of each said arm and being circularly disposed in radially shiftable condition about the axis of said form at an axial distance therefrom with said gripping elements engaging one edge of a ply received on said form; guide means for moving said gripping elements radially inward through an axially and radially shiftable curvilinear path corresponding substantially to the cross-sectional configuration of said form whereby said ply may be applied over said core upon said movement of said gripping elements; said gripping means including a pivoted link arm having one free end thereof defining a gripping element; a second gripping element carried by said link arm and being shiftable into and out of gripping engagement with said first mentioned gripping element; said guide means including at least one axially shiftable cam surface temporarily engageable with a complemental cam surface provided on said gripping element whereby said cam surfaces are moved together axially during one increment of movement through said curvilinear path; and an idler roll adapted to guide said gripping element after disengagement of said cam surfaces said gripping elements moving axially away from said form in substantial parallelism with said axis of rotation during an increment of movement through said curvilinear path.

6. A machine for building the fabric structure of a pneumatic tire, comprising; an annular building form having an axis of rotation and receiving a building ply on the peripheral surface thereof; a circular member concentrically disposed around the axis of said spindle; a plurality of elongate arms arranged in a circular course around said axis of rotation with one end of each said arm being pivotally secured to said ring; a plurality of gripping elements, carried by the opposed end of each said arm and being circularly disposed in radially shiftable condition about the axis of said form at an axial distance therefrom with said gripping elements engaging one edge of a ply received on said form; guide means for moving said gripping elements radially inward through an axially and radially shiftable curvilinear path corresponding substantially to the cross-sectional configuration of said form whereby said ply may be applied over said core upon said movement of said gripping elements; said curvilinear path of movement of said gripping elements including at least one increment of substantially axial movement away from said form; said gripping means including a plurality of link arms pivoted about the axis of said form and having each free end thereof defining a gripping element; a second gripping element carried by each said link arm; inner and outer resilient bands respectively interconnecting said first mentioned gripping elements and said second mentioned gripping elements and being operable to dispose the same in circular relationship about the axis of said core, whereby the inherent resiliency of said bands operates to tensionally urge said first mentioned and said second mentioned gripping elements into gripping engagement with each other.

7. The device of claim 7 further characterized by the presence of means for maintaining said first mentioned and second mentioned gripping elements out of gripping engagement with each other during certain increments of movement along said curvilinear path.

8. The device of claim 8 further characterized by the fact that said guide means includes at least one cam surface capable of moving said link arms axially during a temporary period of cammed engagement therewith; and an idler roll supported about the axis of said form and adapted to guide said gripping element after disengagement of said link arm from said cam surface; said cam surface being spring loaded whereby the same will axially shift after disengagement from said link arm.

9. A tire building machine, comprising; a frame; an annular building form carried by said frame and having an axis of rotation; means for supporting at least one piece of tire fabric ply around the periphery of said form; gripping means engageable with at least one longitudinal edge portion of said tire fabric mounted on said form; and means for moving said gripping means in a retracting curvilinear path with respect to the axis of said form, whereby said fabric is tangentially applied to said form; said gripping means moving through at least one increment of axial movement away from said form in parallelism with said axis of rotation thereof during said movement along said retracting curvilinear path.

10. A machine for building the fabric structure of a pneumatic tire, comprising; a frame; an annular building form carried by said frame and having an axis of rotation and being; a plurality of gripping elements, circularly disposed in radially shiftable condition about the axis of said form at an axial distance therefrom; means for supporting a central width of fabric ply on the external crown surface of said form, whereby one edge portion thereof may be engaged by said axially spaced, circularly disposed, gripping elements; means engageable with said opposed edge portions of said fabric ply to prevent axial movement thereof; means for moving said gripping elements radially inward, through an axially shiftable curvilinear path, whereby said fabric ply is tensionally applied to said form; said curvilinear path including at least one increment of substantially axial movement of said gripping elements away from said form said gripping elements moving in parallelism with said axis of rotation of said form during said increment of axial movement.

11. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form said gripping elements moving in parallelism with said axis of rotation of said form during said increment of axial movement.

12. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form; said building form being capable of being collapsed radially said gripping elements moving in parallelism with said axis of rotation of said form during said increment of axial movement.

13. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form; said building form including a resilient air bag inflatable to toroidal shape said gripping elements moving in parallelism with said axis of rotation of said form during said increment of axial movement.

14. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form; said building form including a cylindrical shell having axially spaced shoulders that define opposed edge surfaces of reduced diameter said gripping elements moving in parallelism with said axis of rotation of said form during said increment of axial movement.

15. The device of claim 14 further characterized by the fact that said shell can be collapsed radially.

16. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form with the said gripping elements moving in substantial parallelism with said axis of rotation during said increment of axial movement; said means for actuating relative movement between said drum and said form including a link member pivoted about said frame and having the opposed free ends thereof connected to said drum and a reciprocal piston provided in said frame, whereby reciprocation of said piston will result in axial movement of said drum.

17. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free end of said gripping mechanism in retracting curvilinear path about one side of said form upon axial movement of said drum; said retracting curvilinear path being interrupted by an increment of axial movement of the free end of said gripping mechanism away from said form said gripping elements moving in parallelism with said axis of rotation of said form during said increment of axial movement; each said drum including a main drum and a secondary drum that is carried by said main drum in axially shiftable relationship therewith.

18. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free end of said gripping mechanism in retracting curvilinear path about one side of said form upon axial movement of said drum; said retracting curvilinear path being interrupted by an increment of axial movement of the free end of said gripping mechanism away from said form said gripping elements moving in parallelism with said axis of rotation of said form during said increment of axial movement; each said drum including a main drum and a secondary drum that is carried by said main drum in axially shiftable relationship therewith; and means for urging said main and secondary drums into axially separated relationship.

19. The device of claim 17 further characterized by the fact that the external diameter of said secondary drum approximates the external diameter of said form.

20. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free end of said gripping mechanism in retracting curvilinear path about one side of said form upon axial movement of said drum; said retracting curvilinear path being interrupted by an increment of axial movement of the free end of said gripping mechanism away from said form said gripping elements moving in parallelism with said axis of rotation of said form during said increment of axial movement; each said drum including a main drum and a secondary drum that is carried by said main drum in axially shiftable relationship therewith; one free end of said secondary drum being contoured to be complemental to the external contour of said form at the point of engagement between said secondary drum and said form.

21. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form said gripping elements moving in parallelism with said axis of rotation of said form during said increment of axial movement; and means for adjusting the radial spacing of the free ends of said gripping mechanism about the common axis of said drum and said form.

22. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form said gripping elements moving in parallelism with said axis of rotation of said form during said increment of axial movement; and means for adjusting the axial spacing of the free ends of said gripping mechanism about the common axis of said drum and said form.

23. A machine for building the fabric structure of a pneumatic tire, comprising; a frame; an annular building form having an axis of rotation and being supported about its axis by said frame; at least one drum, rotatably carried by said frame in axially aligned relationship with said form; means for moving said drum along the common axis of said drum and said form; at least one gripping mechanism having one free end thereof pivotally secured to said drum; means for moving the free ends of said gripping mechanism in a retracting curvilinear path about one side of said form upon axial movement of said drum; said retracting curvilinear path being interrupted by an increment of axial movement of the free end of said gripping mechanism away from said form said gripping elements moving in parallelism with said axis of rotation of said form during said increment of axial movement; means for adjusting the radial spacing of the free ends of said gripping mechanism about the common axis of said drum and said form; and means for adjusting the axial spacing of the free ends of said gripping mechanism about the common axis of said drum and said form.

24. A machine for building the fabric structure of a pneumatic tire, comprising; an elongated frame member; a spindle housing secured to one end of said frame; a spindle, rotatably carried by said spindle guide; a driving sleeve rotatably secured to said spindle; a ply-receiving drum having the hub thereof rotatably secured to said driving sleeve in axially shiftable relationship therewith; a building form having its axis supported in coincident relationship with the axis of said drum and said spindle, and having an external ply-receiving surface; actuating means for moving said drum along the common axis of said drum and said form; support means for supporting at least one fabric ply in cylindrical form on the external crown area of said form; and gripping means interconnecting said drum and one edge portion of said fabric ply supported on said form, whereby said fabric ply is tangentially applied, under tension, about the ply-receiving surface of said form upon relative axial movement between said drum and said form said gripping means moving through a retracting curvilinear path of movement during relative axial movement between said drum and said form; said retracting curvilinear path of movement being interrupted by an increment of axial movement of said gripping means away from said form; said gripping elements moving in parallelism with said axis of rotation of said form during said increment of axial movement; said gripping means being radially adjustable whereby the point of engagement between said gripping mechanism and said fabric ply may be adjusted radially of the axis of said form.

25. A machine for building the fabric structure of a pneumatic tire, comprising; an elongated frame member; a spindle housing secured to one end of said frame; a spindle, rotatably carried by said spindle guide; a driving sleeve rotatably secured to said spindle; a ply-receiving drum having the hub thereof rotatably secured to said driving sleeve in axially shiftable relationship therewith; a building form having its axis supported in coincident relationship with the axis of said drum and said spindle, and having an external ply-receiving surface; actuating means for moving said drum along the common axis of said drum and said form; support means for supporting at least one fabric ply in cylindrical form on the external crown area of said form; and gripping means interconnecting said drum and one edge portion of said fabric ply supported on said form, whereby said fabric ply is tangentially applied, under tension, about the ply-receiving surface of said form upon relative axial movement between said drum and said form said gripping means moving through a retracting curvilinear path of movement during relative axial movement between said drum and said form; said retracting curvilinear path of movement being interrupted by an increment of axial movement of said gripping means away from said form; said gripping elements moving in parallelism with said axis of rotation of said form during said increment of axial movement; said gripping means being axially adjustable whereby the point of engagement between said gripping mechanism and said fabric ply may be adjusted axially of said form.

26. A machine for building the fabric structure of a pneumatic tire, comprising; an elongated frame member; a pair of spindle housings secured to opposed longitudinal ends of said frame; a pair of spindles rotatably carried in axially aligned relationship, by said spindle guides; a pair of driving sleeves, each rotatably secured to said spindle; a pair of ply-receiving drums having the hub portions thereof rotatably secured to said driving sleeves in axially shiftable relationship therewith; a building form having its axis supported in coincident relationship with the axis of said drums and said spindles; means for spacing said form equidistant between said building drums; actuating means for moving said drums along the common axis of said drums and said form; support means for supporting at least one fabric ply in cylindrical form on the external crown area of said form; and a plurality of gripping means interconnecting each said drum with one opposed edge portion of said fabric ply supported on said form, whereby said fabric ply is tangentially applied, under tension, about the ply-receiving surface of said form upon relative axial movement between said drum and said form said gripping means moving through a retracting curvilinear path of movement during relative axial movement between said drum and said form; said retracting curvilinear path of movement being interrupted by an increment of axial movement of said gripping means away from said form; said gripping elements moving in parallelism with said axis of rotation of said form during said increment of axial movement.

27. A machine for building the fabric structure of a pneumatic tire, comprising; an elongated frame member; a pair of spindle housings secured to opposed longitudinal ends of said frame; a pair of spindles rotatably carried in axially aligned relationship, by said spindle guides; a pair of driving sleeves, each rotatably secured to said spindle; a pair of ply-receiving drums having the hub portions thereof rotatably secured to said driving sleeves in axially shiftable relationship therewith; a building form having its axis supported in coincident relationship with the axis of said drums and said spindles; means for spacing said form equidistant between said building drums; actuating means for moving said drums along the common axis of said drums and said form; support means for supporting at least one fabric ply in cylindrical form on the external crown area of said form; and a plurality of gripping means interconnecting each said drum with one opposed edge portion of said fabric ply supported on said form, whereby said fabric ply is tangentially applied, under tension, about the ply-receiving surface of said form upon relative axial movement between said drum and said form, said gripping means moving through a retracting curvilinear path of movement during relative axial movement between said drum and said form; said retracting curvilinear path of movement being interrupted by an increment of axial movement of said gripping means away from said form; said gripping elements moving in parallelism with said axis of rotation of said form during said increment of axial movement; said gripping means being radially adjustable whereby the point of engagement between said gripping means and the opposed edges of said fabric ply may be adjusted radially of the axis of said form.

28. A machine for building the fabric structure of a pneumatic tire, comprising; an elongated frame member; a pair of spindle housings secured to opposed longitudinal ends of said frame; a pair of spindles rotatably carried in axial aligned relationship, by said spindle guides; a pair of driving sleeves, each rotatably secured to said spindle; a pair of ply-receiving drums having the hub portions thereof rotatably secured to said driving sleeves in axially shiftable relationship therewith; a building form having its axis supported in coincident relationship with the axis of said drums and said spindles; means for spacing said form equidistant between said building drums; actuating means for moving said drums along the common axis of said drums and said form; support means for supporting at least one fabric ply in cylindrical form on the external crown area of said form; and a plurality of gripping means interconnecting each said drum with one opposed edge portion of said fabric ply supported on said form, whereby said fabric ply is tangentially applied, under tension, about the ply-receiving surface of said form upon relative axial movement between said drum and said form, said gripping means moving through a retracting curvilinear path of movement during relative axial movement between said drum and said form; said retracting curvilinear path of movement being interrupted by an increment of axial movement of said gripping means away from said form; said gripping means being radially adjustable whereby the point of engagement between said gripping means and the opposed edges of said fabric ply may be adjusted axially of the axis of said form.

References Cited in the file of this patent

UNITED STATES PATENTS

| | | |
|---|---|---|
| 2,313,035 | Breth | Mar. 9, 1943 |
| 2,451,973 | Purdy | Oct. 19, 1948 |
| 2,477,718 | Breth | Aug. 2, 1949 |
| 2,503,815 | Frohlich | Apr. 11, 1950 |
| 2,537,632 | Mansfield et al. | Jan. 9, 1951 |
| 2,555,343 | Jones | June 5, 1951 |
| 2,565,071 | Frazier | Aug. 21, 1951 |
| 2,567,064 | Frazier | Sept. 4, 1951 |
| 2,587,428 | Antonson | Feb. 26, 1952 |

FOREIGN PATENTS

| | | |
|---|---|---|
| 152,039 | Austria | Dec. 27, 1937 |